United States Patent
Reese

(10) Patent No.: US 12,481,805 B2
(45) Date of Patent: Nov. 25, 2025

(54) METHOD FOR INKJET PRINTING A SPECTACLE LENS

(71) Applicant: Carl Zeiss Vision International GmbH, Aalen (DE)

(72) Inventor: Martin Reese, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 19/007,644

(22) Filed: Jan. 2, 2025

(65) Prior Publication Data

US 2025/0131148 A1 Apr. 24, 2025

Related U.S. Application Data

(63) Continuation of application No. PCT/EP2023/068869, filed on Jul. 7, 2023.

(30) Foreign Application Priority Data

Jul. 7, 2022 (EP) .................................... 22183675

(51) Int. Cl.
 *G06F 30/17* (2020.01)
 *B33Y 50/00* (2015.01)
 *B33Y 80/00* (2015.01)

(52) U.S. Cl.
 CPC .............. *G06F 30/17* (2020.01); *B33Y 50/00* (2014.12); *B33Y 80/00* (2014.12)

(58) Field of Classification Search
 CPC .......... G06F 30/00; G06F 30/17; G06F 30/10; B33Y 50/00; B33Y 80/00; B33Y 10/00;
 (Continued)

(56) References Cited

U.S. PATENT DOCUMENTS

| | | |
|---|---|---|
| 2019/0054700 A1 | 2/2019 | Chandar et al. |
| 2021/0362444 A1 | 11/2021 | Totzeck et al. |

(Continued)

FOREIGN PATENT DOCUMENTS

| | | |
|---|---|---|
| EP | 3812142 A1 | 4/2021 |
| WO | 2020165439 A1 | 8/2020 |
| WO | 2021209551 A1 | 10/2021 |

OTHER PUBLICATIONS

Industrial Norm "Ophthalmic optics—Spectacle lenses—Vocabulary (ISO 13666:2019)," English version EN ISO ISO 13666:2019, Dec. 2019.

(Continued)

*Primary Examiner* — Cedric Johnson
(74) *Attorney, Agent, or Firm* — Tautz & Schuhmacher LLC; George Hasselmann

(57) ABSTRACT

A computer-implemented method for generating printing instructions for inkjet printing a spectacle lens, wherein the printing instructions are based on a digital twin of the spectacle lens, the digital twin being sliced into a layer stack. The method includes the steps of 1) positioning a volume element in a discrete $x_{m+1}, y_{m+1}, z_{m+1} \ldots x_{n+1}, y_{n+1}, z_{n+1}$ position of a layer of the layer stack, based on a positioning of a volume element in a discrete $x_m, y_m, z_m \ldots x_n, y_n, z_n$ position of an adjacent layer of the layer stack; or 2) not positioning a volume element in a discrete $x_{m+1}, y_{m+1}, z_{m+1} \ldots x_{n+1}, y_{n+1}, z_{n+1}$ position of a layer of the layer stack, based on a positioning of a volume element in a discrete $x_m, y_m, z_m \ldots x_n, y_n, z_n$ position of an adjacent layer of the layer stack.

23 Claims, 1 Drawing Sheet

(58) Field of Classification Search
CPC ........... B29L 2011/0016; B29C 64/386; B29C 64/112; B29D 11/00961; B29D 11/00009; B29D 11/00432; G02C 7/022
USPC ......................................................... 703/7, 6
See application file for complete search history.

(56) References Cited

U.S. PATENT DOCUMENTS

2022/0242154 A1* 8/2022 Christmann ........... B41M 3/003
2023/0341706 A1* 10/2023 Christmann ..... B29D 11/00009

OTHER PUBLICATIONS

European Search Report issued in EP 22183675.2, to which this application claims priority, mailed Jan. 3, 2023.
International Search Report and Written Opinion issued in PCT/EP2023/068869, to which this application claims priority, mailed Nov. 21, 2023.
International Preliminary Report on Patentability issued in PCT/EP2023/068869, to which this application claims priority, mailed Sep. 18, 2024.
Office Action by the European Patent Office (EPO) issued in EP 23739555.3, which is a counterpart hereof, mailed on Jul. 4, 2025.

* cited by examiner

METHOD FOR INKJET PRINTING A SPECTACLE LENS

CROSS REFERENCE TO RELATED APPLICATIONS

This application is a continuation application of international patent application PCT/EP2023/068869, filed on Jul. 7, 2023 and designating the U.S., which claims priority to European patent application EP 22 183 675.2, filed on Jul. 7, 2022, both of which are hereby incorporated by reference in their entireties.

TECHNICAL FIELD

The present disclosure relates to a computer-implemented method for calculating a digital twin of a spectacle lens.

BACKGROUND

To realize a curved-form spectacle lens, according to ISO 13666:2019(E), section 3.6.2 (curved-form lens), a spectacle lens (3.5.2) having one surface convex in all meridians (3.2.11) and the other surface concave in all meridians, for example, a plurality of layers is inkjet printed in layers, whereby a spatial expansion in x,y direction of the plurality of layers successively increases or decreases in z direction. An increase or decrease of spatial expansion of the plurality of layers is visible as steps in plan view as well as in side view, in particular on a surface of the curved-form lens which has not been in contact with a substrate, the substrate being used as removeable support material for example. An additional processing step, for example polishing to remove the steps or applying a further layer to compensate the steps, usually is required. For example, if, to realize a convex spherical surface of a spectacle lens, the spherical surface as defined in ISO 13666:2019(E), section 3.4.1, the spectacle lens as defined in ISO 13666:2019(E), section 3.5.2, a plurality of circular layers is inkjet printed in layers, a radius determining the circumference of each circular layer of the plurality of circular layers successively decreases from one inkjet printed circular layer to an inkjet printed circular layer on top in z direction. Considering a circular layer of the plurality of circular layers individually, the circular layer may be a continuous circular layer or a non-continuous circular layer. In the continuous circular layer the complete circular area is inkjet printed. In the non-continuous circular layer, an area in between the radius determining the circumference of the circular layer, the radius being the first radius, and a second radius smaller than the first radius is inkjet printed. Further, in the non-continuous circular layer, an area limited by the second radius is not inkjet printed. Again, due to the successively decreasing first radius in the plurality of circular layers stacked in z direction, a front surface and/or back surface of the spectacle lens comprises visible steps in plan view and in side view. These visible steps need to be removed in an additional processing step, for example by polishing the respective surface showing them or by an application of a further layer compensating them. The respective surface may be a surface which has not been in contact with a substrate used as, for example, removable support material. WO 2020/165439 A1 discloses a refractive optical component and a spectacle lens manufactured therefrom. An additive manufacturing method is suggested, the material may be applied droplet by droplet, and the size of the individual droplets and/or the application density may be varied within a single layer.

WO 2021/209551 A1 discloses a method for printing a three-dimensional optical structure built up from layers. In the layers the printing ink is deposited through targeted placement to match calculated thicknesses and lateral dimensions of the respective layers.

SUMMARY

Departing from the above-described disadvantage, obtaining steps on a surface of an inkjet printed spectacle lens, and in particular departing from WO 2021/209551 A1, page 3, lines 4 to 19, disclosing that during printing a layer droplets are placed according to a dither pattern reducing a number of droplets to be placed in a part of the layer homogeneously or inhomogeneously, it has been an object of the present disclosure, as in WO 2021/209551 A1, to provide a possibility for avoiding the formation of steps on a surface of a spectacle lens, thus avoiding an additional processing step to remove or to compensate those steps, and in particular to provide a concrete dithering algorithm for droplet placement.

This problem has been solved by the computer-implemented methods for calculating a digital twin of a spectacle lens for the purpose of a use of the digital twin for a manufacture of a spectacle lens disclosed herein. Exemplary embodiments, which might be realized in an isolated fashion or in any arbitrary combination, are discussed below.

In the computer-implemented method being configured for calculating a digital twin of a spectacle lens for the purpose of a use of the digital twin for a manufacture of the spectacle lens, the digital twin comprising a layer stack, the method is characterized in that one of the following conditions apply:

when in 50% or in less than 50% of discrete $x_m$, $y_m$, $z_m \ldots x_n$, $y_n$, $z_n$ positions of an adjacent layer of the layer stack a volume element is positioned, then no volume element is positioned in discrete $x_{m+1}$, $y_{m+1}$, $z_{m+1} \ldots x_{n+1}$, $y_{n+1}$, $z_{n+1}$ positions of a layer of the layer stack, a discrete $x_{m+1}$, $y_{m+1}$, $z_{m+1} \ldots x_{n+1}$, $y_{n+1}$, $z_{n+1}$ position of the layer being directly adjacent and on top of a respective discrete $x_m$, $y_m$, $z_m \ldots x_n$, $y_n$, $z_n$ position of the adjacent layer;

when in more than 50% of discrete $x_m$, $y_m$, $z_m \ldots x_n$, $y_n$, $z_n$ positions of an adjacent layer of the layer stack a volume element is positioned, then volume elements are positioned in at least one of discrete $x_{m+1a \ldots z}$, $y_{m+1a \ldots z}$, $z_{m+1a \ldots z} \ldots x_{n+1a \ldots z}$, $y_{n+1a \ldots z}$, $z_{n+1a \ldots z}$ positions of a layer of the layer stack, a discrete $x_{m+1a \ldots z}$, $y_{m+1a \ldots z}$, $z_{m+1a \ldots z} \ldots x_{n+1a \ldots z}$, $y_{n+1a \ldots z}$, $z_{n+1a \ldots z}$ position of the layer not being on top of a respective discrete $x_m$, $y_m$, $z_m \ldots x_n$, $y_n$, $z_n$ position of the adjacent layer, discrete $x_{m+1}$, $y_{m+1}$, $z_{m+1} \ldots x_{n+1}$, $y_{n+1}$, $z_{n+1}$ positions of a layer of the layer stack, a discrete $x_{m+1}$, $y_{m+1}$, $z_{m+1} \ldots x_{n+1}$, $y_{n+1}$, $z_{n+1}$ position of the layer being directly adjacent and on top of a respective discrete $x_m$, $y_m$, $z_m \ldots x_n$, $y_n$, $z_n$ position of the adjacent layer.

Volume elements are positioned in discrete positions typically in that each volume element is positioned in one respective discrete position.

The computer-implemented method is suitable for generating printing instructions for inkjet printing a spectacle lens. The computer-implemented method is suitable for the purpose of generating printing instructions, the printing instructions to be used for inkjet printing a spectacle lens.

Typically, in a computer-implemented method for generating printing instructions for inkjet printing a spectacle lens, the printing instructions are based on a digital twin of the spectacle lens, the digital twin being sliced into a layer stack, the method comprises the steps:
(i) positioning a volume element in a discrete $x_{m+1}, y_{m+1}, z_{m+1} \ldots x_{n+1}, y_{n+1}, z_{n+1}$ position of a layer of the layer stack, based on a positioning of a volume element in a discrete $x_m, y_m, z_m \ldots x_n, y_n, z_n$ position of an adjacent layer of the layer stack; or
(ii) not positioning a volume element in a discrete $x_{m+1}, y_{m+1}, z_{m+1} \ldots x_{n+1}, y_{n+1}, z_{n+1}$ position of a layer of the layer stack, based on a positioning of a volume element in a discrete $x_m, y_m, z_m \ldots x_n, y_n, z_n$ position of an adjacent layer of the layer stack.

m,n are indices for a respective x,y,z position in a layer of a layer stack, dependent on a number of x,y,z positions in a respective layer.

Typically, the computer-implemented method is characterized by one of the following conditions:
when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions;
when in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions.

Typically, in a computer-implemented method for generating printing instructions for inkjet printing a spectacle lens, the printing instructions are based on a digital twin of the spectacle lens, the digital twin being sliced into a layer stack, the method comprising the steps:
(i) positioning a volume element in a discrete $x_{m+1}, y_{m+1}, z_{m+1} \ldots x_{n+1}, y_{n+1}, z_{n+1}$ position of a layer of the layer stack, based on a positioning of a volume element in a discrete $x_m, y_m, z_m \ldots x_n, y_n, z_n$ position of an adjacent layer of the layer stack, the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer; or
(ii) not positioning a volume element in a discrete $x_{m+1}, y_{m+1}, z_{m+1} \ldots x_{n+1}, y_{n+1}, z_{n+1}$ position of a layer of the layer stack, based on a positioning of a volume element in a discrete $x_m, y_m, z_m \ldots x_n, y_n, z_n$ position of an adjacent layer of the layer stack, the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer,
is characterized in that one of the following conditions apply:
when in 50% or in less than 50% of discrete $x_m, y_m, z_m \ldots x_n, y_n, z_n$ positions of the adjacent layer a volume element is positioned, then no volume element is positioned in discrete $x_{m+1}, y_{m+1}, z_{m+1} \ldots x_{n+1}, y_{n+1}, z_{n+1}$ positions of the layer;
when in more than 50% of discrete $x_m, y_m, z_m \ldots x_n, y_n, z_n$ positions of the adjacent layer a volume element is positioned, then volume elements are positioned partially in discrete $x_{m+1}, y_{m+1}, z_{m+1} \ldots x_{n+1}, y_{n+1}, z_{n+1}$ positions of the layer.

Not to position a volume element in a discrete $x_{m+1}, y_{m+1}, z_{m+1} \ldots x_{n+1}, y_{n+1}, z_{n+1}$ position when in less than 50% of discrete $x_m, y_m, z_m \ldots x_n, y_n, z_n$ positions of an adjacent layer a volume element is already positioned means that in two adjacent layers volume elements are not directly adjacent and not on top of each other positioned. Instead a volume element is positioned in a discrete $x_{m+1a}, y_{m+1a}, z_{m+1a} \ldots x_{n+1a}, y_{n+1a}, z_{n+1a}$ position which is not on top of a volume element positioned in a discrete $x_m, y_m, z_m \ldots x_n, y_n, z_n$ position of an adjacent layer.

To position a volume element in a discrete $x_{m+1}, y_{m+1}, z_{m+1} \ldots x_{n+1}, y_{n+1}, z_{n+1}$ position or not to position a volume element in a discrete $x_{m+1}, y_{m+1}, z_{m+1} \ldots x_{n+1}, y_{n+1}, z_{n+1}$ position when in 50% or more than 50% of discrete $x_m, y_m, z_m \ldots x_n, y_n, z_n$ positions of an adjacent layer a volume element is already positioned means that typically in a first step a volume element is not positioned in a discrete $x_{m+1}, y_{m+1}, z_{m+1} \ldots x_{n+1}, y_{n+1}, z_{n+1}$ position when in a discrete $x_m, y_m, z_m \ldots x_n, y_n, z_n$ position of an adjacent layer a volume element is already positioned. Instead a volume element is positioned in a discrete $x_{m+1a}, y_{m+1a}, z_{m+1a} \ldots x_{n+1a}, y_{n+1a}, z_{n+1a}$ position which is not on top of a volume element positioned in a discrete $x_m, y_m, z_m \ldots x_n, y_n, z_n$ position of the adjacent layer. When volume elements are positioned in all discrete $x_{m+1a}, y_{m+1a}, z_{m+1a} \ldots x_{n+1a}, y_{n+1a}, z_{n+1a}$ positions then in a second step a volume element is positioned in a discrete $x_{m+1}, y_{m+1}, z_{m+1} \ldots x_{n+1}, y_{n+1}, z_{n+1}$ position. Volume elements need not necessarily to be positioned in all discrete $x_{m+1a}, y_{m+1a}, z_{m+1a} \ldots x_{n+1a}, y_{n+1a}, z_{n+1a}$ positions before a positioning of volume elements in discrete $x_{m+1}, y_{m+1}, z_{m+1} \ldots x_{n+1}, y_{n+1}, z_{n+1}$ positions starts. Typically, when positioning a volume element in a discrete $x_{m+1a}, y_{m+1a}, z_{m+1a} \ldots x_{n+1a}, y_{n+1a}, z_{n+1a}$ position a maximum distance between two volume elements is considered. The maximum distance typically corresponds to a maximum distance of two single ink droplets allowing for a coalescence of the two single ink droplets in an inkjet printed layer and thus ensuring a continuous inkjet printed layer. Typically, when positioning a volume element (i) in a discrete $x_{m+1}, y_{m+1}, z_{m+1} \ldots x_{n+1}, y_{n+1}, z_{n+1}$ position or (ii) in a discrete $x_{m+1a}, y_{m+1a}, z_{m+1a} \ldots x_{n+1a}, y_{n+1a}, z_{n+1a}$ position a variation in a distance between two adjacent volume elements in the layer is minimized. Inkjet printing a spectacle lens in layers considering the minimized variation in a distance between two adjacent ink droplets in a layer, typically enables a smoothest possible surface or interface of the layer. Typically, adjacent volume elements are positioned to result in a variation of a distance between adjacent volume element of less than 50%, typically less than 25%.

"Generating" printing instructions comprises the following steps, typically in the given order:
a) Slicing a digital twin of a spectacle lens into a layer stack. Typically, the digital twin is sliced in that an interface of a layer of the layer stack or a form of an interface of a layer of the layer stack each is a linear combination of a surface form of a front surface and a surface form of a back surface of the digital twin. Typically, for slicing a maximum layer thickness of each layer of the layer stack is preset, the maximum layer thickness typically being determined by a maximum layer thickness inkjet printable with a single ink droplet. Further typically, a positioning of adjacent ink droplets in minimum distance to the single ink droplet in a same layer of the layer stack is considered for the determination of the maximum layer thickness. The positioning of adjacent ink droplets in minimum distance typically prevents the single ink droplet from a complete spreading. Typically the minimum distance is preset by a print resolution of an inkjet printer, typically by a print resolution of an inkjet print head of the ink jet printer. Typically, for slicing a minimum layer thickness of each layer of the layer stack is preset, the minimum layer thickness typically being determined by a minimum layer thickness still leading to a continuous layer. Further typically, a maximum distance of two single ink droplets inkjet printed in a same layer of the layer stack is considered for the determination of the minimum layer thickness. The maximum distance of the two single ink droplets is a maximum distance that allows for a coalescence of the two single ink droplets. Due to the coalescence a continuous layer is inkjet printable.

Typically, slicing ensures a knowledge of a layer thickness in each discrete x,y,z position of each layer of the layer stack. A positioning of ink droplets in a minimum distance, typically according to a print resolution of an inkjet printer, further typically according to a print resolution of an inkjet print head of an inkjet printer, or a positioning of ink droplets in a maximum distance are tools to support slicing the digital twin of the spectacle lens in a layer stack. Typically the spectacle lens is inkjet printed with the inkjet printer. Additionally or alternatively, knowledge of a thickness of the digital twin, i.e., a center thickness, an edge thickness and a thickness in each discrete x,y,z position in between, typically a distance in each discrete x,y,z position between a front surface and a back surface of the digital twin, support slicing the digital twin of the spectacle lens in a layer stack. The center thickness of the digital twin shall mean, analogously to the definition given in ISO 13666:2019(E), section 3.2.47, a thickness of the digital twin of the spectacle lens at its reference point, determined normal to a front surface of the digital twin. The reference point of the digital twin shall correspond, analogously to the definition given in ISO 13666:2019(E), section 3.2.19, to a point on the front surface of the finished inkjet printed spectacle lens at which the verification power of a specific portion applies. The edge thickness shall mean, analogously to the definition given in ISO 13666:2019(E), section 3.2.48, a thickness at a point on an edge of the digital twin of the spectacle lens. The layer thickness in each corresponding x,y,z position of an inkjet printed layer depends on a density of ink droplets in the layer: the more ink droplets are positioned within an area element, the higher a layer thickness in the area element. The area element typically is preset to comprise within a layer more than ten discrete positions for ink droplets, i.e., more than ten positions in which an ink droplet (i) is placed or (ii) could be placed but is not placed. The area element may comprise, typically when projected in a plane held by an x direction and a y direction, for example, an area of 100 discrete positions for ink droplets, ten in x direction and ten in y direction. Phrased differently, in an inkjet printed layer, a layer thickness is defined as number of ink droplets multiplied by a volume of an ink droplet divided by an area of the area element:

$$\text{layer thickness} = \frac{\text{number of ink droplets} \times \text{volume of ink droplet}}{\text{area (area element)}}.$$

Typically, the thickness of the digital twin, i.e., the center thickness, the edge thickness and the thickness in each discrete x,y position in between, typically a distance in each discrete x,y,z position between the front surface and the back surface of the digital twin, is reflected in a thickness distribution of a layer of the layer stack, typically in a thickness distribution of each layer apart from a base layer of the layer stack. Reflecting a thickness distribution shall mean that a ratio of the thickness of the digital twin between two discrete x,y,z positions is identical to a ratio of a layer of the layer stack in two discrete x,y,z positions having identical z positions as two discrete x,y,z positions of the digital twin, typically apart from a base layer.

Typically, the digital twin is sliced to comprise, according to the before mentioned restrictions with respect to a minimum layer thickness or a maximum layer thickness, a maximum number of layers in the layer stack. The digital twin may also be sliced to comprise, according to the before mentioned restrictions with respect to a minimum layer thickness or a maximum layer thickness, a reasonable number of layers in the layer stack. The reasonable number of layers may be a compromise between a possible maximum number of layers and a possible minimum number of layers in the layer stack. The possible maximum number of layers mainly contributes to achieving a predefined power whereas the possible minimum number of layers mainly contributes to avoiding cosmetic defects when inkjet printing a respective spectacle lens in layers;

b) Converting each layer of the layer stack into a spatial volume element pattern. In the spatial volume element pattern each volume element is positioned in a discrete x,y,z position. In the spatial volume element pattern each volume element represents an ink droplet. In the spatial volume element pattern a volume element serves as a virtual placeholder for an ink droplet. In the spatial volume element pattern each volume element positioned in a discrete x,y,z position serves as a virtual placeholder for each ink droplet to be positioned in a corresponding discrete x,y,z position of a spectacle lens, when the spectacle lens is inkjet printed in layers. Each volume element is a computer-readable representation of a digital positioning of an ink droplet in a discrete x,y,z position in the spatial volume element pattern of the digital twin of the spectacle lens. Typically, for converting the digital twin into the spatial volume element pattern a print resolution of an inkjet printer, typically an inkjet print head of the inkjet printer is considered;

c) Transferring the spatial volume element pattern into printing instructions which, when the printing instructions are executed by an inkjet printer, cause the inkjet printer to print the spectacle lens in layers. Typically, transferring the sliced spatial volume element pattern into printing instructions which, when the printing instructions are executed by an inkjet printer, cause an inkjet print head of the inkjet printer to release a jet forming an ink droplet in a corresponding discrete x,y,z position in layers. Typically, the printing instructions are computer-readable data comprising a stack of images, one image for each layer to be inkjet printed, for example tiff images, and a text file, for example in .xml format. The text file typically comprises instructions for an order in which the stack of images corresponding to the layer stack is to be inkjet printed. The text file typically further comprises process parameters that are required to inkjet print the spectacle lens in layers like a power of pinning LEDs to cure the ink droplets, the ink droplets typically comprising a UV-curable fluid, and an increase of the z-position of an inkjet print head after having inkjet printed a layer to avoid collision of the inkjet print head with the inkjet printed layer.

A discrete x,y,z position of a volume element in a spatial volume element pattern of a digital twin of a spectacle lens is "corresponding" to a discrete x,y,z position of an ink droplet when while inkjet printing the spectacle lens in layers the ink droplet is positioned according to the discrete x,y,z position of the volume element in the spatial volume element pattern of the digital twin of the spectacle lens. The ink droplet is positioned in that position that is in the spatial volume element pattern intended for its discrete positioning. Analogously, a discrete x,y,z position of an ink droplet is "corresponding" to a discrete x,y,z position of a volume element in a spatial volume element pattern of a digital twin of a spectacle lens when while inkjet printing the spectacle lens in layers the ink droplet is positioned in that discrete x,y,z position in which the volume element had served as virtual representation or as virtual placeholder in the spatial volume element pattern of the digital twin.

A "discrete x,y,z position" or "discrete x,y,z positions" both of a digital twin of a spectacle lens and of a spectacle lens are comprised in a . . . x,y,z coordinate system. The x,y,z coordinate system typically is defined as follows:

A surface normal at either an apex of a front surface of a digital twin of a spectacle lens or an apex of a back surface of a digital twin of a spectacle lens shall define an origin of a . . . x,y,z coordinate system and a z direction. A surface normal at either an apex of a front surface of a spectacle lens or an apex of a back surface of a spectacle lens shall define an origin of a . . . x,y,z coordinate system and a z direction. A x,y direction shall be in a tangential plane to either the front surface at the respective apex or the back surface at the respective apex. An x direction and a y direction shall be perpendicular to each other in the respective tangential plane.

Instead of the surface normal at the respective apex of the front surface or instead of the surface normal at the respective apex of the back surface an optical center of the a) digital twin of the spectacle lens or b) spectacle lens each may define an origin of a . . . x,y,z coordinate system and a surface normal at the respective optical center may define a z direction. The x,y direction then is in the tangential plane to an intersection with the respective front surface. In the respective tangential plane the x direction and the z direction are perpendicular to each other. The optical center of a digital twin of a spectacle lens is defined analogously as in ISO 13666:2019(E), section 3.2.15, as an intersection of an optical axis with a front surface of the digital twin. The optical center of a spectacle lens is defined as in ISO 13666:2019(E), section 3.2.15, as an intersection of an optical axis (3.1.8) with a front surface (3.2.13) of a spectacle lens (3.5.2).

In case a front surface or a back surface of a a) digital twin of a spectacle lens or b) spectacle lens is for example a power-variation surface or another surface without an unambiguously definably apex, typically a surface normal at a fitting point of the a) digital twin of the spectacle lens or b) spectacle lens each shall define the origin of the x,y,z coordinate system and a primary direction may define a z direction. The primary direction of a digital twin of a spectacle lens is defined analogously as in ISO 13666:2019 (E), section 3.2.25, as direction of a virtually represented line of sight, usually taken to be a horizontal, to an object at an infinite distance assumed with habitual head and body posture when assumed looking straight ahead in unaided vision. The primary direction of a spectacle lens is defined as in ISO 13665:2019(E), section 3.2.25, as direction of a line of sight (3.2.24), usually taken to be a horizontal, to an object at an infinite distance measured with habitual head and body posture when looking straight ahead in unaided vision. In that case, a . . . x,y direction is in a plane perpendicular to the respective primary direction. In the respective plane perpendicular to the respective primary direction an x direction and a y direction are perpendicular to each other.

"Printing instructions" are computer-readable data which, when the printing instructions are executed by an inkjet printer, cause the inkjet printer to inkjet print a spectacle lens.

Printing instructions typically are computer-readable data based on a sliced digital twin of a spectacle lens.

Printing instructions typically are in the form of computer-readable data and are based on a sliced digital twin of a spectacle lens; when the printing instructions are executed by an inkjet printer, the printing instructions cause the inkjet printer to inkjet print a spectacle lens.

The printing instructions being computer-readable data or being in the form of computer-readable data typically are (i) stored on a computer-readable storage medium or (ii) transferred via a data signal. The computer-readable storage medium may be a non-transitory tangible computer-readable storage medium.

The printing instructions typically are configured to, when executed by an inkjet printer, to cause the inkjet printer to inkjet print a spectacle lens. The printing instructions typically are computer-readable data which, when executed by an inkjet printer, are configured to cause the inkjet printer to inkjet print a spectacle lens in layers, wherein in each layer, beginning from a base layer directly adjacent to an optionally removable substrate, ink droplets are positioned in a discrete x,y,z position. The discrete x,y,z positions of the ink droplets positioned in layers to inkjet print a spectacle lens typically correspond to discrete x,y,z positions of volume elements in a spatial volume element pattern of a digital twin of the spectacle lens to be inkjet printed.

The printing instructions are for the purpose of a use thereof for inkjet printing a spectacle lens. The printing instructions are computer-readable data for the purpose of a use of the data for inkjet printing a spectacle lens in layers. The inkjet printing of the spectacle lens typically begins with inkjet printing a base layer directly in or on an optionally removable substrate and continues with inkjet printing layer by layer until the spectacle lens is finished inkjet printed. The positioning of each ink droplet in a discrete x,y,z position in each layer is specified by a corresponding discrete x,y,z position of a volume element in a spatial volume element pattern of a digital twin of the spectacle lens to be inkjet printed.

Typically the printing instructions, when the printing instructions are executed by an inkjet printer, cause a print head of the inkjet printer to release a jet forming an ink droplet in a corresponding discrete x,y,z position in layers.

The substrate the base layer is inkjet printed in or on, or the base layer is directly adjacent to, may be removable from the inkjet printed spectacle lens or may remain with the inkjet printed spectacle lens. Typically, the spectacle lens and the substrate are removable from each other.

Typically, the printing instructions are in a computer-readable data format comprising a stack of images, one image for each layer to be inkjet printed, for example tiff images, and a text file, for example in .xml format, as described before.

A "spatial volume element pattern" is a digital representation in volume elements or a virtual description in volume elements of each layer of a sliced digital twin of a spectacle lens. The digital representation or the virtual description typically are computer-readable data or are in the form of computer-readable data. The computer-readable data may (i) be stored on a computer-readable storage medium, or (ii)

transferred via a data signal. The computer-readable storage medium may be a non-transitory tangible computer-readable storage medium. In a spatial volume element pattern each volume element is spatially positioned in a discrete x,y,z position. In the spatial volume element pattern each volume element in a discrete x,y,z position represents an ink droplet to be positioned in a corresponding discrete x,y,z position when inkjet printing the spectacle lens.

A "digital twin" of a spectacle lens is defined analogously as in ISO 13666:2019(E), section 3.5.2 (spectacle lens), a digital twin of an ophthalmic lens (3.5.1) which when transferred to physical reality is worn in front of, but not in contact with, an eyeball. The digital twin of the spectacle lens may include a design of the spectacle lens, typically based on an ordered power as defined in ISO 13666:2019 (E), section 3.10.14. The digital twin of the spectacle lens is for the purpose of a use for manufacturing the spectacle lens, in particular for inkjet printing the spectacle lens.

For providing a concrete dithering algorithm, the digital twin of the spectacle lens typically is a mathematical description of a lens surface of a front surface of the spectacle lens, a mathematical description of a lens surface of a back surface of the spectacle lens, the mathematical descriptions optionally including (i) a refractive index for the spectacle lens or (ii) a refractive index distribution n (x,y,z) for the spectacle lens. The lens surface of the digital twin is defined analogously to ISO 13666:2019(E), section 3.4. The front surface of the digital twin of the spectacle lens is defined analogously as in ISO 13666:2019(E), section 3.2.13, as a surface which when the digital twin is transferred to physical reality is intended to be fitted away from the eye. The back surface of the digital twin of the spectacle lens is defined analogously as in ISO 13666:2019(E), section 3.2.14, as a surface which when the digital twin is transferred to physical reality is intended to be fitted nearer to the eye. The refractive index for the spectacle lens is a refractive index the spectacle lens should have after having been inkjet printed. The refractive index distribution for the spectacle lens is a refractive index distribution the spectacle lens should have after having been inkjet printed. Typically, the mathematical descriptions of the lens surfaces of the front surface and of the back surface include a relative orientation of the front surface and the back surface to each other, for example, in a same coordinate system and a) a refractive index for the spectacle lens or b) refractive indices for the spectacle lens. Instead of including the relative orientation of the front surface and the back surface in the same coordinate system, the mathematical descriptions may include a relative orientation of the front surface and the back surface and a distance between the front surface and the back surface, typically in one arbitrarily selected point on one of the surfaces.

A digital twin of a spectacle lens is a mathematical description or a mathematical representation of lens surfaces of the spectacle lens, optionally including a refractive index or optionally including a refractive index distribution n (x,y,z), the mathematical description or the mathematical representation being computer-readable data or in the form of computer-readable data. The computer-readable data may (i) be stored on a computer-readable storage medium, or (ii) transferred via a data signal. The computer-readable storage medium may be a non-transitory tangible computer-readable storage medium. The computer-readable data may additionally contain printing instructions to inkjet print a spectacle lens. The computer-readable data may additionally contain printing instructions which, when the printing instructions are executed by an inkjet printer, cause the inkjet printer to inkjet print a spectacle lens.

A digital twin of a spectacle lens may, additionally or alternatively, be, for the purpose of a use of the digital twin for manufacturing the spectacle lens, in particular for inkjet printing the spectacle lens, one of the following:

an analytical description or an analytical model describing or representing the spectacle lens. The analytical description or the analytical model typically is a piecewise description or a piecewise representation and comprises (i) a mathematical formula describing a lens surface of a front surface of the digital twin of the spectacle lens and (ii) a mathematical formula describing a lens surface of a back surface of the digital twin of the spectacle lens and optionally (iii) a mathematical formula describing a refractive index for the spectacle lens or describing refractive indices for the spectacle lens, a relative orientation of the front surface to the back surface, as described before, typically is included in the analytical description or the analytical model;

an analytical description or an analytical model describing or representing the spectacle lens, the analytical description or the analytical model additionally containing printing instructions (i) to inkjet print the spectacle lens or (ii) when executed by an inkjet printer to cause the inkjet printer to inkjet print the spectacle lens;

in the form of an analytical description or an analytical model representing the spectacle lens;

in the form of an analytical description or an analytical model representing the spectacle lens, the analytical description or the analytical model additionally containing printing instructions (i) to inkjet print the spectacle lens or (ii) when executed by an inkjet printer to cause the inkjet printer to inkjet print the spectacle lens;

the analytical description or the analytical model being (i) stored on a computer-readable storage medium or (ii) transferred via a data signal. The computer-readable storage medium may be a non-transitory tangible computer-readable storage medium;

numerical data describing or representing the spectacle lens. The numerical data typically are comprising or being a conversion of the analytical description or the analytical model. The numerical data typically are comprising a pattern which comprises discrete $z_{front}(x, y)$ positions of or on a front surface of the digital twin of the spectacle lens and discrete $z_{back}(x,y)$ positions of or on a back surface of the digital twin of the spectacle lens. The discrete $z_{front}(x,y)$ positions and the discrete $z_{back}(x,y)$ positions typically are considering a print resolution of an inkjet printer, typically a print resolution of an inkjet print head of an inkjet printer. Typically, in each of the discrete $z_{front}(x,y)$ positions and the discrete $z_{back}(x,y)$ positions a lens surface is described by a mathematical formula. So, the numerical data comprises an evaluation of analytical description or an analytical model of the lens surface in each of the discrete x,y positions, typically meaning that the numerical data comprises a function value of the analytical description or the analytical model of a lens surface of at least one of a front and a back surface in each discrete x,y position. The function value in each discrete x,y position, i.e., the discrete x,y,z positions, of the lens surface of the front surface and of the back surface typically are described in a same coordinate system; or a relative orientation of for example coordinate systems of the front surface and the back surface and a distance between the front surface and the back surface, typically in one arbitrarily selected point on one of the surfaces, is comprised in the numerical data. Optionally, a refractive index or a refractive index distribution, the refractive index distribution comprising a pattern which comprises (i) discrete x,y,z positions of or on a front surface of the digital twin of the spectacle lens (n(x,y,z)), (ii) discrete x,y,z positions of or on a back surface of the digital twin of the spectacle lens (n(x,y,z)) and (iii) discrete x,y,z positions in between the front surface and the back surface (n(x,y,z)), is comprised in the numerical data. Typically, the numerical data are taken as a basis for slicing. Compared to taking the analytical description or the analytical model as a basis for slicing, less computing power is needed when the numerical data are taken as a basis for slicing. Phrased differently, slicing the numerical data is computationally less expensive;

numerical data describing or representing the spectacle lens, the numerical data additionally containing printing instructions (i) to inkjet print the spectacle lens or (ii) when executed by an inkjet printer to cause the inkjet printer to inkjet print the spectacle lens;

in the form of numerical data describing or representing the spectacle lens;

in the form of numerical data describing or representing the spectacle lens, the numerical data additionally containing printing instructions (i) to inkjet print the spectacle lens or (ii) when executed by an inkjet printer to cause the inkjet printer to inkjet print the spectacle lens;

the numerical data being (i) stored on a computer-readable storage medium or (ii) transferred via a data signal. The computer-readable storage medium may be a non-transitory tangible computer-readable storage medium;

computer-readable data describing or representing the spectacle lens;

computer-readable data describing or representing the spectacle lens, the computer-readable data additionally containing printing instructions (i) to inkjet print the spectacle lens or (ii) when executed by an inkjet printer to cause the inkjet printer to inkjet print the spectacle lens;

in the form of computer-readable data describing or representing the spectacle lens;

in the form of computer-readable data describing or representing the spectacle lens, the computer-readable data additionally containing printing instructions (i) to inkjet print the spectacle lens or (ii) when executed by an inkjet printer to cause the inkjet printer to inkjet print the spectacle lens;

the computer-readable data being (i) stored on a computer-readable storage medium or (ii) transferred via a data signal. The computer-readable storage medium may be a non-transitory tangible computer-readable storage medium.

A "spectacle lens" or lens is as defined in ISO 13666:2019(E), section 3.5.2, an ophthalmic lens worn in front of, but not in contact with, the eyeball.

A front surface is as defined in ISO 13666:2019(E), section 3.2.13, a surface of a lens (3.5.2) intended to be fitted away from the eye. A back surface is as defined in ISO 13666:2019(E), section 3.2.14, a surface of a lens (3.5.2) intended to be fitted nearer to the eye.

In the context of the present disclosure, a spectacle lens is further a physical representation of a corresponding digital twin of the spectacle lens, the spectacle lens being an inkjet printed physical representation of the corresponding digital twin. A spectacle lens results from a transfer of a digital twin of the spectacle lens to physical reality.

"Slicing" is a conversion of a digital twin of a spectacle lens into a layer stack. Typically, slicing is a conversion of the digital twin digitally represented by numerical data, the numerical data as defined before, into a layer stack. Slicing is a digital conversion of the digital twin into a layer stack in which for each layer a layer thickness is preset. The layer thickness is preset digitally in a center, in an edge and in between in each x,y,z position of the layer. Typically, each layer of the layer stack has an identical spatial expansion, in plan view, when projected in a plane held by an x direction and a y direction.

"Positioning" is a digital placement or virtual arrangement or digital distribution of a volume element in a discrete x,y,z position of each layer of a layer stack of a sliced digital twin of a spectacle lens. The positioning of a volume element in a discrete x,y,z position typically includes (i) a digital placement or virtual arrangement within a layer as well as (ii) a digital placement or virtual arrangement in an adjacent layer, in a next but one layer, in an adjacent layer to a next but one layer, and so on. Typically, the positioning is a digital placement of a single volume element per discrete x,y,z position.

DETAILED DESCRIPTION OF EXEMPLARY EMBODIMENTS

Figure 1:
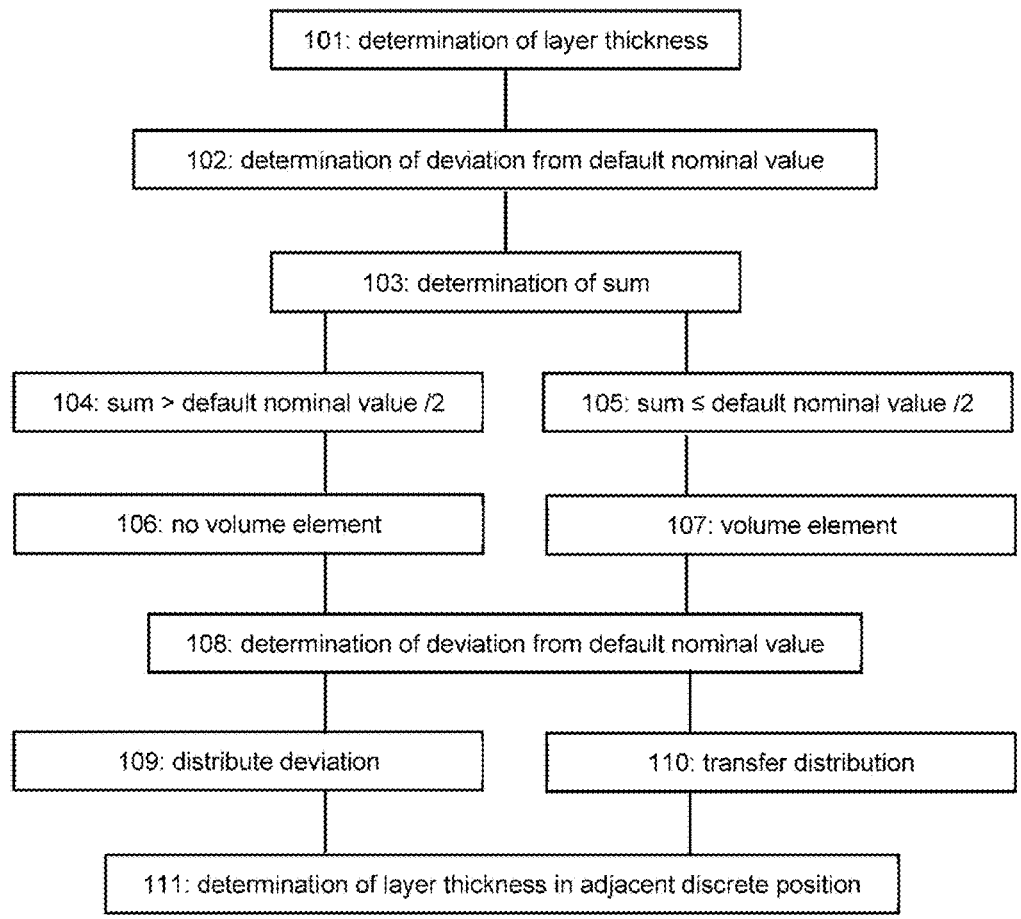
FIG. 1 shows a flow chart of an exemplary embodiment of a method for calculating a digital twin of a spectacle lens.

The positioning of a volume element in a discrete $x_{+1}$, $y_{+1}$, $z_{+1}$ position of a layer depends on or is based on a positioning of a volume element in an adjacent layer in a discrete x,y,z position. In the adjacent layer each volume element is positioned in a discrete x,y,z position. In the adjacent layer, typically when projected in a plane held by an x direction and a y direction, in plan view, each volume element has a discrete x,y,z position. In the layer, typically when projected in a plane held by an x direction and a y direction, in plan view, each volume element has a discrete $x_{+1}$, $y_{+1}$, $z_{+1}$ position, when positioned directly adjacent and on top of a volume element having a discrete x,y,z position in the adjacent layer. The layer and the adjacent layer are stacked in z direction. The z direction is perpendicular to the plane held by the x direction and the y direction.

When positioning volume elements in layers, volume elements of a first adjacent layer on whose volume element positioning a further digital placement of volume elements depend on are digitally placed. After their digital placement those volume elements form then the basis of a second adjacent layer on whose volume element positioning a further digital placement of further volume elements depends on. Those digitally placed volume elements in turn form the basis of a third adjacent layer on whose volume element positioning a further digital placement of further volume elements depend on. The positioning in layers is repeated until volume elements in a final layer are digitally placed dependent on a volume element positioning of a then adjacent layer underneath.

Not positioning a volume element in a discrete $x_{+1}$, $y_{+1}$, $z_{+1}$ position of a layer depends on or is based on a positioning of a volume element in an adjacent layer in a discrete x,y,z position. In the adjacent layer each volume element is (i) positioned in a discrete x,y,z position or (ii) not positioned in a discrete x,y,z position. With respect to the not positioning before given explanation for positioning apply.

A digital twin of a spectacle lens is sliced in a layer stack. The layer stack comprises a plurality of layers. Typically the layer stack comprises up to 200 layers stacked, further typically up to 150 layers stacked. Further typically the layer stack comprises between 50 and 130 layers stacked, further typically between 60 and 120 layers stacked, more typically between 70 and 115 layers stacked and most typically between 80 and 110 layers stacked. Typically for slicing the digital twin of the spectacle lens the print resolution of an inkjet printer, typically an inkjet print head of the inkjet printer, which is to be used for inkjet printing the spectacle lens is considered.

In the layer stack a volume element is
- (i) positioned, i.e., digitally placed or virtually arranged or digitally distributed in a discrete $x_{m+1}, y_{m+1}, z_{m+1} \ldots x_{n+1}, y_{n+1}, z_{n+1}$ position of a layer dependent on a positioning of a volume element in an adjacent layer in a discrete $x_m, y_m, z_m \ldots x_n, y_n, z_n$ position, the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer, for example in plan view, when both the layer and the adjacent layer are projected in a plane held by an x direction and a y direction, or
- (ii) not positioned, i.e., not digitally placed or not virtually arranged or not digitally distributed, in a discrete $x_{m+1}, y_{m+1}, z_{m+1} \ldots x_{n+1}, y_{n+1}, z_{n+1}$ position of a layer dependent on a positioning of a volume element in an adjacent layer in a discrete $x_m, y_m, z_m \ldots x_n, y_n, z_n$ position, the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer, for example in plan view, when both the layer and the adjacent layer are projected in a plane held by an x direction and a y direction.

A volume element has a discrete $x_{m+1}, y_{m+1}, z_{m+1} \ldots x_{n+1}, y_{n+1}, z_{n+1}$ position in a layer typically in plan view when the layer is projected in a plane held by an x direction and a y direction. A volume element having a discrete $x_{m+1}, y_{m+1}, z_{m+1} \ldots x_{n+1}, y_{n+1}, z_{n+1}$ position in a layer is directly adjacent and on top of a volume element having a discrete $x_m, y_m, z_m \ldots x_n, y_n, z_n$ position in an adjacent layer, typically the adjacent layer also in plan view when projected in a plane held by an x direction and a y direction, if the two volume elements differ only in their z position. In the layer stack, typically in plan view with all layers projected in a plane held by an x direction and a y direction, volume elements are digitally placed on top of each other when having an identical x,y position but having a different z position. Digitally placed on top of each other means in a layer, $z_{m+1}$, a next but one layer, $z_{m+2}$, a layer adjacent to a next but one layer, $z_{m+3}$, and so on. Digitally placed on top of each other does not mean that in each of a layer, $z_{m+1}$, a next but one layer, $z_{m+2}$, a layer adjacent to a next but one layer, $z_{m+3}$, and so on, a volume element is digitally placed, a volume element could be digitally placed on top of each other in any layer of the layer stack in a $z_m$ position but need not to be placed in each layer in a $z_m$ position. In case a volume element is not digitally placed in a layer, $z_{m+1}$, but in a next but one layer, $z_{m+2}$, or in a layer adjacent to a next but one layer, $z_{m+3}$, and so on, the volume element and a volume element digitally placed in a $z_m$ position are, when having an identical x,y position, on top of each other but not adjacent to each other.

Positioning or not positioning "a" volume element in a discrete x,y,z position of a respective layer typically includes positioning or not positioning more volume elements in different discrete x,y,z positions of the respective layer, typically one volume element of the more volume elements per discrete x,y,z position.

In the layer stack the positioning of volume elements typically begins with a digital placement of volume elements in a base layer. The base layer typically is a digital representation of a layer directly adjacent to a substrate. The base layer typically is a digital representation of a layer which is inkjet printed in or on a substrate. In the base layer, typically in plan view when projected in a plane held by an x direction and a y direction, in each discrete x,y,z position of the base layer a volume element is digitally placed. The base layer, typically in plan view when projected in a plane held by an x direction and a y direction, is having a constant thickness. In the layer stack the positioning of volume elements ends with a digital placement of volume elements in a final layer. In an inkjet printed spectacle lens the base layer is or forms either a front surface or a back surface of the spectacle lens, the final layer then is or forms accordingly a back surface or a front surface thereof. In between the base layer and the final layer a
- (i) positioning of volume elements in a discrete $x_{m+1}, y_{m+1}, z_{m+1} \ldots x_{n+1}, y_{n+1}, z_{n+1}$ position of a layer, or
- (ii) not positioning of volume elements in a discrete $x_{m+1}, y_{m+1}, z_{m+1} \ldots x_{n+1}, y_{n+1}, z_{n+1}$ position of a layer, each depends on or is based on a positioning of a volume element in an adjacent layer in a discrete $x_m, y_m, z_m \ldots x_n, y_n, z_n$ position.

Positioning or not positioning of volume elements in a discrete $x_{m+1}, y_{m+1}, z_{m+1} \ldots x_{n+1}, y_{n+1}, z_{n+1}$ position of the layer typically means that more volume elements are positioned in different discrete $x_{m+1}, y_{m+1}, z_{m+1} \ldots x_{n+1}, y_{n+1}, z_{n+1}$ positions of the layer, one volume element is positioned or not positioned in one $x_{m+1}, y_{m+1}, z_{m+1} \ldots x_{n+1}, y_{n+1}, z_{n+1}$ position of the different discrete $x_{m+1}, y_{m+1}, z_{m+1} \ldots x_{n+1}, y_{n+1}, z_{n+1}$ positions. The more volume elements typically depend on a number of volume elements to be positioned.

In the layer stack the
- (i) positioning of volume elements in a discrete $x_{m+1}, y_{m+1}, z_{m+1} \ldots x_{n+1}, y_{n+1}, z_{n+1}$ position of a layer or first layer adjacent to the base layer, a discrete $x_{m+1}, y_{m+1}, z_{m+1} \ldots x_{n+1}, y_{n+1}, z_{n+1}$ position of the layer or first layer being directly adjacent and on top of a respective $x_m, y_m, z_m \ldots x_n, y_n, z_n$ of the base layer, typically in plan view when both of the layer and the base layer are projected in a plane held by an x direction and a y direction, or
- (ii) not positioning of volume elements in a discrete $x_{m+1}, y_{m+1}, z_{m+1} \ldots x_{n+1}, y_{n+1}, z_{n+1}$ position of a layer or first layer adjacent to the base layer, a discrete $x_{m+1}, y_{m+1}, z_{m+1} \ldots x_{n+1}, y_{n+1}, z_{n+1}$ position of the layer or first layer being directly adjacent and on top of a respective $x_m, y_m, z_m \ldots x_n, y_n, z_n$ of the base layer, typically in plan view when both the layer and the base layer are projected in a plane held by an x direction and a y direction, each depends on or is based on a positioning of a volume element in the adjacent base layer in a discrete $x_m, y_m, z_m \ldots x_n, y_n, z_n$ position.

In the layer stack the (i) positioning of volume elements in a discrete $x_{m+2}, y_{m+2}, z_{m+2} \ldots x_{n+2}, y_{n+2}, z_{n+2}$ position of a next but one layer or second layer, a discrete $x_{m+2}, y_{m+2}, z_{m+2} \ldots x_{n+2}, y_{n+2}, z_{n+2}$ position of the next but one layer or second layer being on top of a respective $x_m, y_m, z_m \ldots x_n, y_n, z_n$ of the base layer, typically in plan view when both the next but one layer and the base layer are projected in a plane held by an x direction and a y direction, or (ii) not positioning of volume elements in a discrete $x_{m+2}, y_{m+2}, z_{m+2} \ldots x_{n+2}, y_{n+2}, z_{n+2}$ position of a next but one layer or second layer, a discrete $x_{m+2}, y_{m+2}, z_{m+2} x_{n+2}, y_{n+2}, z_{n+2}$ position of the next but one layer or second layer being on top of a respective $x_m, y_m, z_m \ldots x_n, y_n, z_n$ of the base layer, typically in plan view when both the next but one layer and the base layer are projected in a plane held by an x direction and a y direction, each depends on or is based on a positioning of a volume element in the layer or first layer in a discrete $x_{m+1}, y_{m+1}, z_{m+1} \ldots x_{n+1}, y_{n+1}, z_{n+1}$ position. The next but one layer or second layer is adjacent to the layer or first layer and next but one to the base layer.

In the layer stack the (i) positioning of volume elements in a discrete $x_{m+3}, y_{m+3}, z_{m+3} \ldots x_{n+3}, y_{n+3}, z_{n+3}$ position of a layer adjacent to a next but one layer or third layer, a discrete $x_{m+3}, y_{m+3}, z_{m+3} \ldots x_{n+3}, y_{n+3}, z_{n+3}$ position of the layer adjacent to the next but one layer being on top of a $\ldots x_m, y_m, z_m \ldots x_n, y_n, z_n$ of the base layer, typically in plan view when both the layer adjacent to the next but one layer and the base layer are projected in a plane held by an x direction and a y direction, or (ii) not positioning of volume elements in a discrete $x_{m+3}, y_{m+3}, z_{m+3} \ldots x_{n+3}, y_{n+3}, z_{n+3}$ position of a layer adjacent to a next but one layer or third layer, a discrete $x_{m+3}, y_{m+3}, z_{m+3} \ldots x_{n+3}, y_{n+3}, z_{n+3}$ position of the layer adjacent to the next but one layer being on top of a $\ldots x_m, y_m, z_m \ldots x_n, y_n, z_n$ of the base layer, typically in plan view when both the layer adjacent to the next but one layer and the base layer are projected in a plane held by an x direction and a y direction, each depends on or is based on a positioning of a volume element in the next but one layer or second layer in a discrete $x_{m+2}, y_{m+2}, z_{m+2} \ldots x_{n+2}, y_{n+2}, z_{n+2}$ position. The layer adjacent to a next but one layer or third layer is a layer adjacent to the next but one layer or second layer, is a next but one layer to the layer or first layer and adjacent to the next but one layer of the base layer.

In the layer stack the (i) positioning of volume elements or (ii) not positioning of volume elements in a discrete $x_{m+u}, y_{m+u}, z_{m+u} \ldots x_{n+v}, y_{n+v}, z_{n+v}$ position is repeated until volume elements in the final layer are (i) positioned or (ii) not positioned.

The (i) positioning of a volume element in a discrete $x_{m+1}, y_{m+1}, z_{m+1} \ldots x_{n+1}, y_{n+1}, z_{n+1}$ position or the (ii) not positioning of a volume element in a discrete $x_{m+1}, y_{m+1}, z_{m+1} \ldots x_{n+1}, y_{n+1}, z_{n+1}$ position, each dependent on or being based on a positioning of a volume element in an adjacent layer in a discrete $x_m, y_m, z_m \ldots x_n, y_n, z_n$ position results in a variation of a volume element density. Typically, the variation of the volume element density is given in each layer of the layer stack apart from the base layer. The variation of the volume element density in a layer of the layer stack of the sliced digital twin is a digital representation of a variation of ink droplets in a layer. Printing instructions comprising the variation of the volume element density executed by an inkjet printer, cause an inkjet printer, typically a printhead of the inkjet printer, to release a jet forming an ink droplet according to the variation in layers. A variation of ink droplets in a layer results in a variation of a layer thickness of the layer. A variation of the layer thickness avoids issues with respect to waviness in an inkjet printed spectacle lens. In contrast to WO 2020/165439 A1 disclosing on page 25, lines 10 to 18, or on page 26, lines 23 to 30, to vary a droplet density within a single layer, the present disclosure not only suggests varying a density of ink droplets in a layer but to vary a volume element density, digitally representing a density of ink droplets, in a layer based on a positioning of a volume element in an adjacent layer so that the volume elements that are representing the ink droplets are typically placed complementary to an adjacent layer. This has as decisive advantage of avoiding steps on a surface of an inkjet printed spectacle lens, both in plan view and in side view. Also, residual structures that can impact the optical quality of the spectacle lens are minimized in each layer.

The before described variation of a volume element density in a layer of a digital twin of a spectacle lens resulting from positioning or not positioning a volume element in a discrete position dependent on a positioning or not positioning of a volume element in an adjacent discrete position underneath of an adjacent layer effects that each layer of the digital twin contributes to a power of the digital twin, the power defined analogously as in ISO 13666:2019 (E), section 3.1.10, as capacity of the digital twin of the spectacle lens or virtual representation of an optical surface to calculate a change of a curvature or a direction of a virtually represented incident wavefront by refraction. The contribution of each layer to the power of the digital twin depends on the number of layers the digital twin is sliced into. Thus, the contribution of each layer to the power of the digital twin is 1/number of layers. For example, in case a digital twin of a spectacle lens is sliced in 100 layers, a contribution of each layer of the 100 layers to the power of the digital twin is $\frac{1}{100}$. Accordingly, in an inkjet printed spectacle lens a layer thickness variation corresponding to the variation of volume element density in a respective layer of the digital twin effects that each inkjet printed layer contributes to a power of the spectacle lens, the power as defined in ISO 13666:2019(E), section 3.1.10, as capacity of a spectacle lens (3.5.2) or optical surface to change the curvature or direction of incident wavefronts by refraction. The contribution of each inkjet printed layer to the power of the spectacle lens depends on the number of layers needed for inkjet printing the spectacle. The number of layers in turn corresponds to the number of layers of the corresponding sliced digital twin. Thus, the contribution of each layer to the power of the spectacle lens is 1/number of layers. In contrast to each layer contributing to the power of the digital twin of the spectacle lens and accordingly to the power of the spectacle lens, a power of a spectacle lens disclosed in WO 2021/209551 A1 is effected by a form of a front surface and a form of a back surface. This in turn means that an inevitable superelevation of a printed layer shown in WO 2021/209551 A1, FIG. 2 and disclosed on page 1, lines 26 to 28, as occurring at edges of printed layers due to a surface tension of a printing ink adding up and resulting in a printed structure whose shape differs from the intended shape has a greater influence on the power of the spectacle lens of WO 2021/209551 A1 than on the power of the before described digital twin or respective before described spectacle lens. Therefore, WO 2021/209551 A1 has the problem to control and minimize for example by blank spaces an always present superelevation at an edge of a layer as the power of the spectacle lens otherwise deviates due to the in WO 2021/209551 A1 described superelevations from an intended power whereas the before described digital twin and the respective before described spectacle lens do not have the problem of WO 2021/209551 A1 to this extent as here each layer contributes to the power of the digital twin and the respective spectacle lens.

"Positioning a volume element" shall include a positioning of one volume element in a discrete x,y,z position or a positioning of more volume elements in discrete x,y,z positions. A positioning of more volume elements shall include a positioning of one volume element of the more volume elements per discrete x,y,z position, i.e., as described before, one volume element is positioned in one respective discrete x,y,z position.

"Not positioning a volume element" shall mean that in a discrete x,y,z position no volume element is positioned.

"Discrete" shall mean an integer multiple of a minimum nozzle distance of an inkjet print head or an arrangement of two or more inkjet print heads.

"An inkjet print head" shall mean a single inkjet print head or an arrangement of two or more inkjet print heads.

"Layer thickness" is, typically of a sliced digital twin of a spectacle lens projected in a plane held by an x direction and a y direction, in side view, in z direction, a shortest distance between a point
- on an outermost surface of a layer to a point perpendicular to the point in z direction on the nearest interface of the layer, or
- on an interface of a layer to another layer to a point perpendicular to the point in z direction on the nearest interface of the layer.

The above-described problem is fully solved by a computer-implemented method described in the forgoing. A targeted positioning of a volume element in a layer dependent on or based on a positioning of a volume element in an adjacent layer results in a variation of a volume element density in the layer. The variation in volume element density results in a variation of a layer thickness when an ink jet printer, typically a print head of the inkjet printer, releases a jet forming an ink droplet in a corresponding position to the targeted positioned volume element. Thus, in turn avoids to a formation of steps in an inkjet printed spectacle lens.

In an exemplary embodiment of the disclosure, the computer-implemented method is characterized by one of the following conditions:
- when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions and volume elements are positioned in each of a discrete $x_{m+2}, y_{m+2}, z_{m+2} \ldots x_{n+2}, y_{n+2}, z_{n+2}$ positions of a next but one layer of the layer stack;
- when in 50% or more than 50% of the discrete $x_m, y_m, z_m \ldots x_n, y_n, z_n$ positions a volume element is positioned, then volume elements are positioned partially in
  - the discrete $x_{m+1}, y_{m+1}, z_{m+1} \ldots x_{n+1}, y_{n+1}, z_{n+1}$ positions, and
  - discrete $x_{m+2}, y_{m+2}, z_{m+2} \ldots x_{n+2}, y_{n+2}, z_{n+2}$ positions of a next but one layer of the layer stack;
a discrete $x_{m+2}, y_{m+2}, z_{m+2} \ldots x_{n+2}, y_{n+2}, z_{n+2}$ position of the next but one layer being directly adjacent and on top of a discrete $x_{m+1}, y_{m+1}, z_{m+1} \ldots x_{n+1}, y_{n+1}, z_{n+1}$ position of the layer.

When in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions and, volume elements are positioned partially in discrete $x_{m+2}, y_{m+2}, z_{m+2} \ldots x_{n+2}, y_{n+2}, z_{n+2}$ positions of a next but one layer of the layer stack.

Not to position a volume element in a discrete $x_{m+1}, y_{m+1}, z_{m+1} \ldots x_{n+1}, y_{n+1}, z_{n+1}$ position of a layer when in less than 50% of discrete $x_m, y_m, z_m \ldots x_n, y_n, z_n$ positions of an adjacent layer a volume element is already positioned but to position a volume element in a discrete $x_{m+2}, y_{m+2}, z_{m+2} \ldots x_{n+2}, y_{n+2}, z_{n+2}$ position when in less than 50% of discrete $x_m, y_m, z_m \ldots x_n, y_n, z_n$ positions of the adjacent layer a volume element is already positioned means that a volume element of the next but one layer is positioned on top of a volume element of the adjacent layer but that these two volume elements are not adjacent to each other. In the layer in between the adjacent layer and the next but one layer a volume element is positioned in a discrete $x_{m+1a}, y_{m+1a}, z_{m+1a} \ldots x_{n+1a}, y_{n+1a}, z_{n+1a}$ position which is not on top of a volume element positioned in a discrete $x_m, y_m, z_m \ldots x_n, y_n, z_n$ position of the adjacent layer. Typically, as mentioned before, when positioning a volume in a discrete $x_{m+1a}, y_{m+1a}, z_{m+1a} \ldots x_{n+1a}, y_{n+1a}, z_{n+1a}$ position a maximum distance between two volume elements is considered. Typically, as explained before, in the layer a variation in a distance between two adjacent volume elements is minimized.

To position a volume element in a discrete $x_{m+1}, y_{m+1}, z_{m+1} \ldots x_{n+1}, y_{n+1}, z_{n+1}$ position or not to position a volume element in a discrete $x_{m+1}, y_{m+1}, z_{m+1} \ldots x_{n+1}, y_{n+1}, z_{n+1}$ position of a layer when in 50% or more than 50% of discrete $x_m, y_m, z_m \ldots x_n, y_n, z_n$ positions of an adjacent layer a volume element is already positioned and to position a volume element in a discrete $x_{m+2}, y_{m+2}, z_{m+2} \ldots x_{n+2}, y_{n+2}, z_{n+2}$ position or not to position a volume element in a discrete $x_{m+2}, y_{m+2}, z_{m+2} \ldots x_{n+2}, y_{n+2}, z_{n+2}$ position of a next but one layer to the adjacent layer when in 50% or more than 50% of discrete $x_m, y_m, z_m \ldots x_n, y_n, z_n$ positions of the adjacent layer a volume element is already positioned means that typically in a first step a volume element is not positioned in a discrete $x_{m+1}, y_{m+1}, z_{m+1} \ldots x_{n+1}, y_{n+1}, z_{n+1}$ position of the layer when in a discrete $x_m, y_m, z_m \ldots x_n, y_n, z_n$ position of the adjacent layer a volume element is already positioned and a volume element is not positioned in a discrete $x_{m+2}, y_{m+2}, z_{m+2} \ldots x_{n+2}, y_{n+2}, z_{n+2}$ position of the next but one layer when in a discrete $x_m, y_m, z_m \ldots x_n, y_n, z_n$ position of the adjacent layer a volume element is already positioned. Instead a volume element is positioned in a discrete $x_{m+1a}, y_{m+1a}, z_{m+1a} \ldots x_{n+1a}, y_{n+1a}, z_{n+1a}$ position which is not adjacent and not on top of a volume element positioned in a discrete $x_m, y_m, z_m \ldots x_n, y_n, z_n$ position of the adjacent layer and instead a volume element is positioned in a discrete $x_{m+2b}, y_{m+2b}, z_{m+2b} \ldots x_{n+2b}, y_{n+2b}, z_{n+2b}$ position of the next but one layer which is not adjacent to and not on top of a volume element positioned in a discrete $x_{m+1a}, y_{m+1a}, z_{m+1a} \ldots x_{n+1a}, y_{n+1a}, z_{n+1a}$ position of the layer and which is not on top of a volume element positioned in a discrete $x_m, y_m, z_m \ldots x_n, y_n, z_n$ position of the adjacent layer. When volume elements are positioned in all discrete $x_{m+1a}, y_{m+1a}, z_{m+1a} \ldots x_{n+1a}, y_{n+1a}, z_{n+1a}$ positions and in all discrete $x_{m+2b}, y_{m+2b}, z_{m+2b} \ldots x_{n+2b}, y_{n+2b}, z_{n+2b}$ positions then in a second step a volume element is positioned in a discrete $x_{m+1}, y_{m+1}, z_{m+1} \ldots x_{n+1}, y_{n+1}, z_{n+1}$ position and in a discrete $x_{m+2}, y_{m+2}, z_{m+2} \ldots x_{n+2}, y_{n+2}, z_{n+2}$ position. Volume elements may be positioned in a discrete $x_{m+1}, y_{m+1}, z_{m+1} \ldots x_{n+1}, y_{n+1}, z_{n+1}$ position and/or in a discrete $x_{m+2}, y_{m+2}, z_{m+2} \ldots x_{n+2}, y_{n+2}, z_{n+2}$ position before volume elements in all discrete $x_{m+1a}$, $y_{m+1a}$, $z_{m+1a}$ ... $x_{n+1a}$, $y_{n+1a}$, $z_{n+1a}$ positions and in all discrete $x_{m+2b}$, $y_{m+2b}$, $z_{m+2b}$ ... $x_{n+2b}$, $y_{n+2b}$, $z_{n+2b}$ positions are positioned. Typically, when positioning a volume in a discrete $x_{m+1a}$, $y_{m+1a}$, $z_{m+1a}$ ... $x_{n+1a}$, $y_{n+1a}$, $z_{n+1a}$ position or in a discrete $x_{m+2b}$, $y_{m+2b}$, $z_{m+2b}$ ... $x_{n+2b}$, $y_{n+2b}$, $z_{n+2b}$ position in each of the layer and the next but one layer a maximum distance between two volume elements is considered. The maximum distance typically corresponds to a maximum distance of two single ink droplets allowing for a coalescence of the two single ink droplets in an inkjet printed layer and thus ensuring a continuous inkjet printed layer. Typically, when positioning a volume element (i) in a discrete $x_{m+1}$, $y_{m+1}$, $z_{m+1}$ ... $x_{n+1}$, $y_{n+1}$, $z_{n+1}$ position, (ii) in a discrete $x_{m+1a}$, $y_{m+1a}$, $z_{m+1a}$ ... $x_{n+1a}$, $y_{n+1a}$, $z_{n+1a}$ position, (iii) in a discrete $x_{m+2b}$, $y_{m+2b}$, $z_{m+2b}$ ... $x_{n+2b}$, $y_{n+2b}$, $z_{n+2b}$ position, or in a discrete $x_{m+2}$, $y_{m+2}$, $z_{m+2}$ ... $x_{n+2}$, $y_{n+2}$, $z_{n+2}$ position a variation in a distance between two adjacent volume elements in the layer or the next but one layer is minimized. Inkjet printing a spectacle lens in layers considering the minimized variation in a distance between two adjacent ink droplets in a layer, typically enables a smoothest possible surface or interface of the layer or the next but one layer.

In an exemplary embodiment of the disclosure, the computer-implemented method is characterized by the following condition:

when in 50% or more than 50% of the discrete $x_{m+2}$, $y_{m+2}$, $z_{m+2}$ ... $x_{n+2}$, $y_{n+2}$, $z_{n+2}$ positions and in 66% or less than 66% of the discrete $x_{m+2}$, $y_{m+2}$, $z_{m+2}$ $x_{n+2}$, $y_{n+2}$, $z_{n+2}$ positions of the next but one layer a volume element is to be positioned, then the volume element is positioned in a discrete $x_{m+2b}$, $y_{m+2b}$, $z_{m+2b}$ ... $x_{n+2b}$, $y_{n+2b}$, $z_{n+2b}$ position not adjacent and not on top of a volume element in a discrete $x_{m+1}$, $y_{m+1}$, $z_{m+1}$ ... $x_{n+1}$, $y_{n+1}$, $z_{n+1}$ position of the layer and not on top of a volume element in a discrete $x_m$, $y_m$, $z_m$ ... $x_n$, $y_n$, $z_n$ position of the adjacent layer, or a discrete $x_{m+2a}$, $y_{m+2a}$, $z_{m+2a}$ ... $x_{n+2a}$, $y_{n+2a}$, $z_{n+2a}$ position adjacent and on top of a volume element in a discrete $x_{m+1a}$, $y_{m+1a}$, $z_{m+1a}$ ... $x_{n+1a}$, $y_{n+1a}$, $z_{n+1a}$ position of the layer and not on top of a volume element in a discrete $x_m$, $y_m$, $z_m$ ... $x_n$, $y_n$, $z_n$ position of the adjacent layer, or a discrete $x_{m+2b}$, $y_{m+2b}$, $z_{m+2b}$ ... $x_{n+2b}$, $y_{n+2b}$, $z_{n+2b}$ position not adjacent and not on top of a volume element in a discrete $x_{m+1}$, $y_{m+1}$, $z_{m+1}$ ... $x_{n+1}$, $y_{n+1}$, $z_{n+1}$ position of the layer and on top of a volume element in a discrete $x_{mb}$, $y_{mb}$, $z_{mb}$ ... $x_{nb}$, $y_{nb}$, $z_{nb}$ position of the adjacent layer, or a discrete $x_{m+2a}$, $y_{m+2a}$, $z_{m+2a}$ ... $x_{n+2a}$, $y_{n+2a}$, $z_{n+2a}$ position adjacent and on top of a volume element in a discrete $x_{m+1a}$, $y_{m+1a}$, $z_{m+1a}$ ... $x_{n+1a}$, $y_{n+1a}$, $z_{n+1a}$ position of the layer and on top of a volume element in a discrete $x_{ma}$, $y_{ma}$, $z_{ma}$ ... $x_{na}$, $y_{na}$, $z_{na}$ position of the adjacent layer.

Typically, this condition considers a positioning of volume elements in the next but one layer. Typically, for positioning a volume element in the layer one of the above-described conditions shall apply.

Typically, as explained before, when positioning a volume in a discrete $x_{m+1a}$, $y_{m+1a}$, $z_{m+1a}$ ... $x_{n+1a}$, $y_{n+1a}$, $z_{n+1a}$ position of the layer or in a discrete $x_{m+2b}$, $y_{m+2b}$, $z_{m+2b}$ ... $x_{n+2b}$, $y_{n+2b}$, $z_{n+2b}$ position of the next but one layer a maximum distance between two volume elements is considered. Typically, as explained before, in each of the before mentioned layers a variation in a distance between two adjacent volume elements is minimized.

Typically, when in 50% or more than 50% of the discrete $x_{m+2}$, $y_{m+2}$, $z_{m+2}$ ... $x_{n+2}$, $y_{n+2}$, $z_{n+2}$ positions and in 66% or less than 66% of the discrete $x_{m+2}$, $y_{m+2}$, $z_{m+2}$ ... $x_{n+2}$, $y_{n+2}$, $z_{n+2}$ positions of the next but one layer a volume element is to be positioned, then the volume element is positioned in a discrete $x_{m+2b}$, $y_{m+2b}$, $z_{m+2b}$ ... $x_{n+2b}$, $y_{n+2b}$, $z_{n+2b}$ position not adjacent and not on top of a volume element in a discrete $x_{m+1}$, $y_{m+1}$, $z_{m+1}$ ... $x_{n+1}$, $y_{n+1}$, $z_{n+1}$ position of the layer and not on top of a volume element in a discrete $x_m$, $y_m$, $z_m$ ... $x_n$, $y_n$, $z_n$ position of the adjacent layer.

In case in 50% or more than 50% of the discrete $x_{m+2}$, $y_{m+2}$, $z_{m+2}$ ... $x_{n+2}$, $y_{n+2}$, $z_{n+2}$ positions and in 66% or less than 66% of the discrete $x_{m+2}$, $y_{m+2}$, $z_{m+2}$ ... $x_{n+2}$, $y_{n+2}$, $z_{n+2}$ positions of the next but one layer a volume element is to be positioned and either (i) in one of the layer or the adjacent layer a volume element is already positioned in a discrete $x_{m+1}$, $y_{m+1}$, $z_{m+1}$ ... $x_{n+1}$, $y_{n+1}$, $z_{n+1}$ position or in a discrete $x_m$, $y_m$, $z_m$ ... $x_n$, $y_n$, $z_n$ position, or (ii) in both of the layer or the adjacent layer a volume element is already positioned in a discrete $x_{m+1}$, $y_{m+1}$, $z_{m+1}$ ... $x_{n+1}$, $y_{n+1}$, $z_{n+1}$ position and in a discrete $x_m$, $y_m$, $z_m$ ... $x_n$, $y_n$, $z_n$ position, typically the respective before mentioned positioning shall apply.

In an exemplary embodiment of the disclosure, the computer-implemented method is characterized by the following condition:

when in more than 66% of discrete $x_{m+3}$, $y_{m+3}$, $z_{m+3}$ ... $x_{n+3}$, $y_{n+3}$, $z_{n+3}$ positions and in 75% or less than 75% of the discrete $x_{m+3}$, $y_{m+3}$, $z_{m+3}$ ... $x_{n+3}$, $y_{n+3}$, $z_{n+3}$ positions of an adjacent layer to the next but one layer a volume element is to be positioned, then the volume element is positioned in a discrete $x_{m+3b}$, $y_{m+3b}$, $z_{m+3b}$ ... $x_{n+3b}$, $y_{n+3b}$, $z_{n+3b}$ position not adjacent and not on top of a volume element in a discrete $x_{m+2}$, $y_{m+2}$, $z_{m+2}$ ... $x_{n+2}$, $y_{n+2}$, $z_{n+2}$ position of the next but one layer and not on top of a volume element in a discrete $x_{m+1}$, $y_{m+1}$, $z_{m+1}$ ... $x_{n+1}$, $y_{n+1}$, $z_{n+1}$ position of the layer and not on top of a volume element in a discrete $x_m$, $y_m$, $z_m$ ... $x_n$, $y_n$, $z_n$ position of the adjacent layer, or a discrete $x_{m+3b}$, $y_{m+3b}$, $z_{m+3b}$ ... $x_{n+3b}$, $y_{n+3b}$, $z_{n+3b}$ position not adjacent and not on top of a volume element in a discrete $x_{m+2}$, $y_{m+2}$, $z_{m+2}$ ... $x_{n+2}$, $y_{n+2}$, $z_{n+2}$ position of the next but one layer and not on top of a volume element in a discrete $x_{m+1}$, $y_{m+1}$, $z_{m+1}$ ... $x_{n+1}$, $y_{n+1}$, $z_{n+1}$ position of the layer and on top of a volume element in a discrete $x_{mb}$, $y_{mb}$, $z_{mb}$ ... $x_{nb}$, $y_{nb}$, $z_{nb}$ position of the adjacent layer, or a discrete $x_{m+3b}$, $y_{m+3b}$, $z_{m+3b}$ ... $x_{n+3b}$, $y_{n+3b}$, $z_{n+3b}$ position not adjacent and not on top of a volume element in a discrete $x_{m+2}$, $y_{m+2}$, $z_{m+2}$ ... $x_{n+2}$, $y_{n+2}$, $z_{n+2}$ position of the next but one layer and on top of a volume element in a discrete $x_{m+1b}$, $y_{m+1b}$, $z_{m+1b}$ ... $x_{n+1b}$, $y_{n+1b}$, $z_{n+1b}$ position of the layer and not on top of a volume element in a discrete $x_m$, $y_m$, $z_m$ ... $x_n$, $y_n$, $z_n$ position of the adjacent layer, or a discrete $x_{m+3a}$, $y_{m+3a}$, $z_{m+3a}$ ... $x_{n+3a}$, $y_{n+3a}$, $z_{n+3a}$ position adjacent and on top of a volume element in a discrete $x_{m+2a}$, $y_{m+2a}$, $z_{m+2a}$ ... $x_{n+2a}$, $y_{n+2a}$, $z_{n+2a}$ position of the next but one layer and not on top of a volume element in a discrete $x_{m+1}$, $y_{m+1}$, $z_{m+1}$ ... $x_{n+1}$, $y_{n+1}$, $z_{n+1}$ position of the layer and not on top of a volume element in a discrete $x_m$, $y_m$, $z_m$ ... $x_n$, $y_n$, $z_n$ position of the adjacent layer, or a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}, z_{ma} \ldots x_{na}, y_{na}, z_{na}$ position of the adjacent layer, or a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_{ma}, y_{ma}, z_{ma} \ldots x_{na}, y_{na}, z_{na}$ position of the adjacent layer, or a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and on top of a volume element in a discrete $x_{mb}, y_{mb}, z_{mb} \ldots x_{nb}, y_{nb}, z_{nb}$ position of the adjacent layer, or a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

Typically, this condition considers a positioning of volume elements in the adjacent layer to a next but one layer. An overview with respect to possible positionings of volume elements in three layers underneath the adjacent layer to a next but one layer is given in table 1, summarizing the before mentioned. Typically, for positioning a volume element in the layer and in the next but one layer one of the above-described conditions shall apply.

Typically, as explained before, when positioning a volume in a discrete $x_{m+1}, y_{m+1}, z_{m+1} \ldots x_{n+1}, y_{n+1}, z_{n+1}$ position, in a discrete $x_{m+1a}, y_{m+1a}, z_{m+1a} \ldots x_{n+1a}, y_{n+1a}, z_{n+1a}$ position, in a discrete $x_{m+1b}, y_{m+1b}, z_{m+1b} \ldots x_{n+1b}, y_{n+1b}, z_{n+1b}$ position, in a discrete $x_{m+2}, y_{m+2}, z_{m+2} \ldots x_{n+2}, y_{n+2}, z_{n+2}$ position, in a discrete $x_{m+2a}, y_{m+2a}, z_{m+2a} \ldots x_{n+2a}, y_{n+2a}, z_{n+2a}$ position, in a discrete $x_{m+2b}, y_{m+2b}, z_{m+2b} \ldots x_{n+2b}, y_{n+2b}, z_{n+2b}$ position, in a discrete $x_{m+3a}, y_{m+3a}, z_{m+3a} \ldots x_{n+3a}, y_{n+3a}, z_{n+3a}$ position, or in a discrete $x_{m+3b}, y_{m+3b}, z_{m+3b} \ldots x_{n+3b}, y_{n+3b}, z_{n+3b}$ position in each of the layers a maximum distance between two volume elements is considered. Typically, as explained before, in each of the before mentioned layers a variation in a distance between two adjacent volume elements is minimized.

TABLE 1

Possible positionings of volume elements in layer stack underneath adjacent layer to next but one layer

| Next but one layer | $x_{m+2}, y_{m+2}, z_{m+2} \ldots$ $x_{n+2}, y_{n+2}, z_{n+2}$ | − | − | − | + | + | + | − | + |
|---|---|---|---|---|---|---|---|---|---|
| Layer | $x_{m+1}, y_{m+1}, z_{m+1} \ldots$ $x_{n+1}, y_{n+1}, z_{n+1}$ | − | − | + | − | − | + | + | + |

TABLE 1-continued

Possible positionings of volume elements in layer stack underneath adjacent layer to next but one layer

| Adjacent layer | $x_m, y_m, z_m \ldots$ $x_n, y_n, z_n$ | − | + | − | − | + | − | + | + |
|---|---|---|---|---|---|---|---|---|---|

− = no volume positioned,
+ = volume element positioned

Typically, when in more than 66% of discrete $x_{m+3}, y_{m+3}, z_{m+3} \ldots x_{n+3}, y_{n+3}, z_{n+3}$ positions and in 75% or less than 75% of the discrete $x_{m+3}, y_{m+3}, z_{m+3} \ldots x_{n+3}, y_{n+3}, z_{n+3}$ positions of an adjacent layer to the next but one layer a volume element is to be positioned, then the volume element is positioned in a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer.

In case in more than 66% of discrete $x_{m+3}, y_{m+3}, z_{m+3} x_{n+3}, y_{n+3}, z_{n+3}$ positions and in 75% or less than 75% of the discrete $x_{m+3}, y_{m+3}, z_{m+3} \ldots x_{n+3}, y_{n+3}, z_{n+3}$ positions of an adjacent layer to the next but one layer a volume element is to be positioned and (i) in one of the next but one layer, the layer or the adjacent layer a volume element is already positioned in a discrete $x_{m+2}, y_{m+2}, z_{m+2} \ldots x_{n+2}, y_{n+2}, z_{n+2}$ position, a discrete $x_{m+1}, y_{m+1}, z_{m+1} \ldots x_{n+1}, y_{n+1}, z_{n+1}$ position or in a discrete $x_m, y_m, z_m \ldots x_n, y_n, z_n$ position, or (ii) in two of the next but one layer, the layer or the adjacent layer a volume element is already positioned in a discrete $x_{m+2}, y_{m+2}, z_{m+2} \ldots x_{n+2}, y_{n+2}, z_{n+2}$ position, a discrete $x_{m+1}, y_{m+1}, z_{m+1} \ldots x_{n+1}, y_{n+1}, z_{n+1}$ position or in a discrete $x_m, y_m, z_m \ldots x_n, y_n, z_n$ position, or (iii) in each the next but one layer, the layer and the adjacent layer a volume element is already positioned in a discrete $x_{m+2}, y_{m+2}, z_{m+2} \ldots x_{n+2}, y_{n+2}, z_{n+2}$ position, a discrete $x_{m+1}, y_{m+1}, z_{m+1} \ldots x_{n+1}, y_{n+1}, z_{n+1}$ position and in a discrete $x_m, y_m, z_m \ldots x_n, y_n, z_n$ position, typically the respective before mentioned positioning shall apply.

In an exemplary embodiment of the disclosure, the computer-implemented method is characterized by the following condition:

when in more than 75% of discrete $x_{m+4}, y_{m+4}, z_{m+4} \ldots x_{n+4}, y_{n+4}, z_{n+4}$ positions and in less than 80% of the discrete $x_{m+4}, y_{m+4}, z_{m+4} \ldots x_{n+4}, y_{n+4}, z_{n+4}$ positions of a layer separated by three layers from the adjacent layer, i.e., of a layer being separated by the layer, the next but one layer, the adjacent layer to the next but one layer from the adjacent layer, a volume element is to be positioned, then the volume element is positioned in a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} x_{n+3}, y_{n+3}, z_{n+3}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1},$ $z_{n+1}$ position of the layer and not on top of a volume element in a discrete $x_m, y_m, z_m \ldots x_n, y_n, z_n$ position of the adjacent layer, or a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_m, y_m, z_m \ldots x_n, y_n, z_n$ position of the adjacent layer, or a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and not on top of a volume element in a discrete $x_m, y_m, z_m \ldots x_n, y_n, z_n$ position of the adjacent layer, or a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and on top of a volume element in a discrete $x_{m+2b}, y_{m+2b}, z_{m+2b} \ldots x_{n+2b}, y_{n+2b}, z_{n+2b}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and on top of a volume element in a discrete $x_{mb}, y_{mb}, z_{mb} \ldots x_{nb}, y_{nb}, z_{nb}$ position of the adjacent layer, or a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and on top of a volume element in a discrete $x_{m+2b}, y_{m+2b}, z_{m+2b} \ldots x_{n+2b}, y_{n+2b}, z_{n+2b}$ position of the next but one layer and on top of a volume element in a discrete $x_{m+1b}, y_{m+1b}, z_{m+1b} \ldots x_{n+1b}, y_{n+1b}, z_{n+1b}$ position of the layer and not on top of a volume element in a discrete $x_m, y_m, z_m \ldots x_n, y_n, z_n$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}, z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and on top of a volume element in a discrete $x_{m+2b}, y_{m+2b}, z_{m+2b} \ldots x_{n+2b}, y_{n+2b}, z_{n+2b}$ position of the next but one layer and on top of a volume element in a discrete $x_{m+1b}, y_{m+1b}, z_{m+1b} \ldots x_{n+1b}, y_{n+1b}, z_{n+1b}$ position of the layer and on top of a volume element in a discrete $x_{mb}, y_{mb}, z_{mb} \ldots x_{nb}, y_{nb}, z_{nb}$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}, z_{ma} \ldots x_{na}, y_{na}, z_{na}$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}, z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}, z_{ma} \ldots x_{na}, y_{na}, z_{na}$ position of the adjacent layer, or in a discrete $x_{m+2}, y_{m+2}, z_{m+2} \ldots x_{n+2}, y_{n+2}, z_{n+2}$ position, in a discrete $x_{m+2a}, y_{m+2a}, z_{m+2a} \ldots x_{n+2a}, y_{n+2a}, z_{n+2a}$ position, in a discrete $x_{m+2b}, y_{m+2b}, z_{m+2b} \ldots x_{n+2b}, y_{n+2b}, z_{n+2b}$ position, in a discrete $x_{m+3}, y_{m+3}, z_{m+3} \ldots x_{n+3}, y_{n+3}, z_{n+3}$ position, in a discrete $x_{m+3a}, y_{m+3a}, z_{m+3a} \ldots x_{n+3a}, y_{n+3a}, z_{n+3a}$ position, in a discrete $x_{m+3b}, y_{m+3b}, z_{m+3b} \ldots x_{n+3b}, y_{n+3b}, z_{n+3b}$ position, in a discrete $x_{m+4a}, y_{m+4a}, z_{m+4a} \ldots x_{n+4a}, y_{n+4a}, z_{n+4a}$ position or in a discrete $x_{m+4b}, y_{m+4b}, z_{m+4b} \ldots x_{n+4b}, y_{n+4b}, z_{n+4b}$ position, in each of these layers a maximum distance between two volume elements is considered. Typically, as explained before, in each of the before mentioned layers a variation in a distance between two adjacent volume elements is minimized.

TABLE 2

Possible positionings of volume elements in layer stack underneath layer separated by three layers from adjacent layer

| | | | | | | | | | | |
|---|---|---|---|---|---|---|---|---|---|---|
| Adjacent layer to next but one layer | $x_{m+3}, y_{m+3}, z_{m+3} \ldots$ $x_{n+3}, y_{n+3}, z_{n+3}$ | − | − | − | + | − | − | + | + | + |
| Next but one layer | $x_{m+2}, y_{m+2}, z_{m+2} \ldots$ $x_{n+2}, y_{n+2}, z_{n+2}$ | − | − | + | − | − | + | + | − | + | − |
| Layer | $x_{m+1}, y_{m+1}, z_{m+1} \ldots$ $x_{n+1}, y_{n+1}, z_{n+1}$ | − | − | + | − | − | + | − | + | + | − | + |
| Adjacent layer | $x_m, y_m, z_m \ldots x_n, y_n, z_n$ | − | + | − | − | + | + | − | − | − | − |
| adjacent layer to next but one layer | $x_{m+3}, y_{m+3}, z_{m+3} \ldots x_{n+3}, y_{n+3}, z_{n+3}$ | − | + | + | + | | + | | | | |
| next but one layer | $x_{m+2}, y_{m+2}, z_{m+2} \ldots x_{n+2}, y_{n+2}, z_{n+2}$ | + | − | + | | + | + | | | | |
| Layer | $x_{m+1}, y_{m+1}, z_{m+1} \ldots x_{n+1}, y_{n+1}, z_{n+1}$ | + | + | − | + | + | | | | | |
| adjacent layer | $x_m, y_m, z_m \ldots x_n, y_n, z_n$ | + | + | + | − | + | | | | | |

− = no volume positioned,
+ = volume element positioned a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

Typically, this condition considers a positioning of volume elements in the layer separated by three layers from the adjacent layer. An overview with respect to possible positionings of volume elements in four layers underneath the adjacent layer to a next but one layer is given in table 2, summarizing the before mentioned. Typically, for positioning a volume element in the layer, in the next but one layer and in the adjacent layer to the next but one layer one of the above-described conditions shall apply.

Typically, as explained before, when positioning a volume in a discrete $x_{m+1}, y_{m+1}, z_{m+1} \ldots x_{n+1}, y_{n+1}, z_{n+1}$ position, in a ... $x_{m+1a}, y_{m+1a}, z_{m+1a} \ldots x_{n+1a}, y_{n+1a}, z_{n+1a}$ position, in a ... $x_{m+1b}, y_{m+1b}, z_{m+1b} \ldots x_{n+1b}, y_{n+1b}, z_{n+1b}$ position, Typically, when in more than 75% of discrete $x_{m+4}, y_{m+4}, z_{m+4} \ldots x_{n+4}, y_{n+4}, z_{n+4}$ positions and in less than 80% of the discrete $x_{m+4}, y_{m+4}, z_{m+4} \ldots x_{n+4}, y_{n+4}, z_{n+4}$ positions of a layer separated by three layers from the adjacent layer, a volume element is to be positioned, then the volume element is positioned in a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} x_{n+3}, y_{n+3}, z_{n+3}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer.

In case, when in more than 75% of discrete $x_{m+4}, y_{m+4}, z_{m+4} \ldots x_{n+4}, y_{n+4}, z_{n+4}$ positions and in less than 80% of the discrete $x_{m+4}, y_{m+4}, z_{m+4} \ldots x_{n+4}, y_{n+4}, z_{n+4}$ positions of a layer separated by three layers from the adjacent layer a volume element is to be positioned and
  (i) in one of the adjacent layer to the next but one layer, the next but one layer, the layer or the adjacent layer a volume element is already positioned in a discrete $x_{m+3}, y_{m+3}, z_{m+3} \ldots x_{n+3}, y_{n+3}, z_{n+3}$ position, in a discrete $x_{m+2}, y_{m+2}, z_{m+2} \ldots x_{n+2}, y_{n+2}, z_{n+2}$ position, in a discrete $x_{m+1}, y_{m+1}, z_{m+1} \ldots x_{n+1}, y_{n+1}, z_{n+1}$ position or in a discrete $x_m, y_m, z_m \ldots x_n, y_n, z_n$ position, or
  (ii) in two of the adjacent layer to the next but one layer, the next but one layer, the layer or the adjacent layer a volume element is already positioned in a discrete $x_{m+3}, y_{m+3}, z_{m+3} \ldots x_{n+3}, y_{n+3}, z_{n+3}$ position, in a discrete $x_{m+2}, y_{m+2}, z_{m+2} x_{n+2}, y_{n+2}, z_{n+2}$ position, in a discrete $x_{m+1}, y_{m+1}, z_{m+1} \ldots x_{n+1}, y_{n+1}, z_{n+1}$ position or in a discrete $x_m, y_m, z_m \ldots x_n, y_n, z_n$ position, or
  (iii) in three of the adjacent layer to the next but one layer, the next but one layer, the layer or the adjacent layer a volume element is already positioned in a discrete $x_{m+3}$, $y_{m+3}$, $z_{m+3}$ ... $x_{n+3}$, $y_{n+3}$, $z_{n+3}$ position, in a discrete $x_{m+2}$, $y_{m+2}$, $z_{m+2}$ $x_{n+2}$, $y_{n+2}$, $z_{n+2}$ position, in a discrete $x_{m+1}$, $y_{m+1}$, $z_{m+1}$ ... $x_{n+1}$, $y_{n+1}$, $z_{n+1}$ position or in a discrete $x_m$, $y_m$, $z_m$ ... $x_n$, $y_n$, $z_n$ position, or (iv) in each of the adjacent layer to the next but one layer, the next but one layer, the layer or the adjacent layer a volume element is already positioned in a discrete $x_{m+3}$, $y_{m+3}$, $z_{m+3}$ ... $x_{n+3}$, $y_{n+3}$, $z_{n+3}$ position, in a discrete $x_{m+2}$, $y_{m+2}$, $z_{m+2}$ ... $x_{n+2}$, $y_{n+2}$, $z_{n+2}$ position, in a discrete $x_{m+1}$, $y_{m+1}$, $z_{m+1}$ ... $x_{n+1}$, $y_{n+1}$, $z_{n+1}$ position or in a discrete $x_m$, $y_m$, $z_m$ ... $x_n$, $y_n$, $z_n$ position typically the respective before described positioning shall apply.

In an exemplary embodiment of the disclosure, the computer-implemented method is characterized by the following additional step:

(iii) determining a deviation of an actual value of a layer thickness in a discrete $x_m$, $y_m$, $z_m$ ... $x_n$, $y_n$, $z_n$ position of the adjacent layer from a default nominal value of the layer thickness in an identical discrete $x_m$, $y_m$, $z_m$ ... $x_n$, $y_n$, $z_n$ position of the adjacent layer.

As described above slicing a digital twin of a spectacle lens into a layer stack determines in each discrete x,y,z position a layer thickness of each layer of the layer stack. The layer thickness is preset. The layer thickness has in each discrete x,y,z position a default nominal value.

As further described above each layer of the layer stack is converted in a spatial volume element pattern in which volume elements are positioned or not positioned in discrete x,y,z positions. A volume element may be represented for example as cuboid with preset edge lengths, typically a volume element is represented as cube with a preset edge length. Typically, when projecting the layer stack in a plane held by an x direction and a y direction and when viewing each layer of the layer stack as spatial volume element pattern for example in side view then in each discrete x,y,z position an actual value of a layer thickness is determined. Positioning of one volume element or more volume elements in a discrete x,y,z position of a layer results, as described before one volume element per discrete x,y,z position, when viewing the layer in side view, in an actual value of a layer thickness in the discrete x,y,z position that is larger than a default nominal value of a layer thickness in an identical discrete x,y,z position of the layer, or
smaller than a default nominal value of a layer thickness in an identical discrete x,y, z position of the layer, or
equal to a default nominal value of a layer thickness in an identical discrete x,y,z position of the layer.

A deviation of the actual value to the default nominal value is a difference between these two values.

In an exemplary embodiment of the disclosure, the computer-implemented method is characterized by the following additional step:

(iv) determining a sum of the deviation and the actual value of the layer thickness.

A determination of the sum is used as valid basis for positioning or for not positioning a volume element in a discrete $x_{m+1}$, $y_{m+1}$, $z_{m+1}$ ... $x_{n+1}$, $y_{n+1}$, $z_{n+1}$ position of the layer. Thus, the determination is used for deciding if a volume element is positioned adjacent and on top of a volume element in a discrete $x_m$, $y_m$, $z_m$ ... $x_n$, $y_n$, $z_n$ position of the adjacent layer.

The computer-implemented method being configured for calculating a digital twin of a spectacle lens for the purpose of a use of the digital twin for a manufacture of the spectacle lens, the digital twin comprising a layer stack, the method being characterized in the step of:

determining a sum of a deviation of a layer thickness and an actual value of a layer thickness, the deviation being a deviation of an actual value of a layer thickness in a discrete $x_m$, $y_m$, $z_m$ ... $x_n$, $y_n$, $z_n$ position of an adjacent layer from a default nominal value of the layer thickness in an identical discrete $x_m$, $y_m$, $z_m$ ... $x_n$, $y_n$, $z_n$ position of the adjacent layer.

Again, the computer-implemented method is suitable for generating printing instructions for inkjet printing a spectacle lens. The computer-implemented method is suitable for the purpose of generating printing instructions, the printing instructions to be used for inkjet printing a spectacle lens.

WO 2021/209551 A1 describes for example on page 8, lines 8 to 18, that to match a calculated layer thickness, i.e., a nominal thickness, during printing a layer depositing printing ink is controlled and possible deviations of a layer thickness are compensated. WO 2021/209551 A1 discloses on page 6, lines 11 to 13, to determine deviations by confocal scanning, and further page 6, line 30 to 33, to use a simulation for determining deviations of all layers to be printed before printing these layers. Thus, WO 2021/209551 A1, uses a control of a layer thickness during printing to match a nominal layer thickness of the printed layer or a simulation to matching nominal layer thicknesses of to be printed layers. WO 2021/209551 A1 does not disclose to decide based on a sum of a deviation of a layer thickness and an actual value of the layer thickness in an identical x,y,z position upon a positioning a volume element or, while printing, a droplet in a position directly adjacent and on top of the x,y,z position.

In an exemplary embodiment of the disclosure, the computer-implemented method is further characterized by one of the following conditions:

when in less than 50% of the discrete $x_m$, $y_m$, $z_m$ ... $x_n$, $y_n$, $z_n$ positions a volume element is positioned, then no volume element is positioned in each of the discrete $x_{m+1}$, $y_{m+1}$, $z_{m+1}$ ... $x_{n+1}$, $y_{n+1}$, $z_{n+1}$ positions;

when in 50% or more than 50% of the discrete $x_m$, $y_m$, $z_m$ ... $x_n$, $y_n$, $z_n$ positions a volume element is positioned, then volume elements are positioned partially in the discrete $x_{m+1}$, $y_{m+1}$, $z_{m+1}$ ... $x_{n+1}$, $y_{n+1}$, $z_{n+1}$ positions.

Reference is made to the explanations provided above.

In an exemplary embodiment of the disclosure, the computer-implemented method is further characterized by one of the following conditions:

when in less than 50% of the discrete $x_m$, $y_m$, $z_m$ ... $x_n$, $y_n$, $z_n$ positions a volume element is positioned, then no volume element is positioned in each of the discrete $x_{m+1}$, $y_{m+1}$, $z_{m+1}$ ... $x_{n+1}$, $y_{n+1}$, $z_{n+1}$ positions and volume elements are positioned in each of a discrete $x_{m+2}$, $y_{m+2}$, $z_{m+2}$ ... $x_{n+2}$, $y_{n+2}$, $z_{n+2}$ positions of a next but one layer of the layer stack;

when in 50% or more than 50% of the discrete $x_m$, $y_m$, $z_m$ ... $x_n$, $y_n$, $z_n$ positions a volume element is positioned, then volume elements are positioned partially in
the discrete $x_{m+1}$, $y_{m+1}$, $z_{m+1}$ ... $x_{n+1}$, $y_{n+1}$, $z_{n+1}$ positions, and
discrete $x_{m+2}$, $y_{m+2}$, $z_{m+2}$ $x_{n+2}$, $y_{n+2}$, $z_{n+2}$ positions of a next but one layer of the layer stack; a discrete $x_{m+2}$, $y_{m+2}$, $z_{m+2}$ ... $x_{n+2}$, $y_{n+2}$, $z_{n+2}$ position of the next but one layer being directly adjacent and on top of a discrete $x_{m+1}, y_{m+1}, z_{m+1} \ldots x_{n+1}, y_{n+1}, z_{n+1}$ position of the layer.

Reference is made to the description given before.

In an exemplary embodiment of the disclosure, the computer-implemented method is further characterized in that the following condition apply:

when in 50% or more than 50% of the discrete $x_{m+2}, y_{m+2}, z_{m+2} \ldots x_{n+2}, y_{n+2}, z_{n+2}$ positions and in 66% or less than 66% of the discrete $x_{m+2}, y_{m+2}, z_{m+2} \ldots x_{n+2}, y_{n+2}, z_{n+2}$ positions of the next but one layer a volume element is to be positioned, then the volume element is positioned in a. a discrete $x_{m+2b}, y_{m+2b}, z_{m+2b} \ldots x_{n+2b}, y_{n+2b}, z_{n+2b}$ position not adjacent and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or b. a discrete $x_{m+2a}, y_{m+2a}, z_{m+2a} \ldots x_{n+2a}, y_{n+2a}, z_{n+2a}$ position adjacent and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or c. a discrete $x_{m+2b}, y_{m+2b}, z_{m+2b} \ldots x_{n+2b}, y_{n+2b}, z_{n+2b}$ position not adjacent and not on top of a volume element in a discrete $x_{m+1}, y_{m+1}, z_{m+1} \ldots x_{n+1}, y_{n+1}, z_{n+1}$ position of the layer and on top of a volume element in a discrete $x_{mb}, y_{mb}, z_{mb} \ldots x_{nb}, y_{nb}, z_{nb}$ position of the adjacent layer, or d. a discrete $x_{m+2a}, y_{m+2a}, z_{m+2a} \ldots x_{n+2a}, y_{n+2a}, z_{n+2a}$ position adjacent and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

Reference is made to the information provided before.

In an exemplary embodiment of the disclosure, the computer-implemented method is further characterized in that the following condition apply:

when in more than 66% of discrete $x_{m+3}, y_{m+3}, z_{m+3} x_{n+3}, y_{n+3}, z_{n+3}$ positions and in 75% or less than 75% of the discrete $x_{m+3}, y_{m+3}, z_{m+3} \ldots x_{n+3}, y_{n+3}, z_{n+3}$ positions of an adjacent layer to the next but one layer a volume element is to be positioned, then the volume element is positioned in a. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or b. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{mb}, y_{mb}, z_{mb} \ldots x_{nb}, y_{nb}, z_{nb}$ position of the adjacent layer, or c. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and not on top of a volume element in a discrete $x_m, y_m, z_m \ldots x_n, y_n, z_n$ position of the adjacent layer, or d. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or e. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}, z_{ma} \ldots x_{na}, y_{na}, z_{na}$ position of the adjacent layer, or f. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_{ma}, y_{ma}, z_{ma} \ldots x_{na}, y_{na}, z_{na}$ position of the adjacent layer, or g. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and on top of a volume element in a discrete $x_{mb}, y_{mb}, z_{mb} \ldots x_{nb}, y_{nb}, z_{nb}$ position of the adjacent layer, or h. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

Reference is made to the further information given before.

In an exemplary embodiment of the disclosure, the computer-implemented method is further characterized in that the following condition apply:

when in more than 75% of discrete $x_{m+4}, y_{m+4}, z_{m+4} \ldots x_{n+4}, y_{n+4}, z_{n+4}$ positions and in less than 80% of the discrete $x_{m+4}, y_{m+4}, z_{m+4} \ldots x_{n+4}, y_{n+4}, z_{n+4}$ positions of a layer separated by three layers from the adjacent layer, i.e., of a layer being separated by the layer, the next but one layer, the adjacent layer to the next but one layer from the adjacent layer, a volume element is to be positioned, then the volume element is positioned as described before.

Reference is made to the further information given before in this context.

In an exemplary embodiment of the disclosure, the computer-implemented method is further characterized by one of the following conditions:

when the sum is larger than half the default nominal value of the layer thickness then no volume element is positioned in a discrete $x_{m+1}, y_{m+1}, z_{m+1} \ldots x_{n+1}, y_{n+1}, z_{n+1}$ position of the layer of the layer stack;

when the sum is smaller than or equal to half the default nominal value of the layer thickness then a volume element is positioned in a discrete $x_{m+1}$, $y_{m+1}$, $z_{m+1}$ ... $x_{n+1}$, $y_{n+1}$, $z_{n+1}$ position of the layer of the layer stack.

As mentioned before, a discrete $x_{m+1}$, $y_{m+1}$, $z_{m+1}$ ... $x_{n+1}$, $y_{n+1}$, $z_{n+1}$ position of a layer is directly adjacent and on top of a respective discrete $x_m$, $y_m$, $z_m$ ... x, y, z position of an adjacent layer.

As the volume elements may be represented as cuboids with a preset edge lengths, typically as cubes of a preset edge length and the layer thickness in each discrete x,y position of each layer is preset by slicing a digital twin of a spectacle lens into a layer stack,
- (i) a positioning of one volume element or more volume elements in the discrete $x_{m+1}$, $y_{m+1}$, $z_{m+1}$ ... $x_{n+1}$, $y_{n+1}$, $z_{n+1}$ position(s) or
- (ii) a not positioning of one volume element or more volume elements in the discrete $x_{m+1}$, $y_{m+1}$, $z_{m+1}$ ... $x_{n+1}$, $y_{n+1}$, $z_{n+1}$ position(s), each according to the condition corrects a deviation of an actual value of a layer thickness in a discrete $x_m$, $y_m$, $z_m$ ... $x_n$, $y_n$, $z_n$ position of an adjacent layer from a default nominal value of the layer thickness in an identical discrete $x_m$, $y_m$, $z_m$ ... $x_n$, $y_n$, $z_n$ position of the adjacent layer. The correction of the deviation may
correct the actual value to correspond to the default nominal value, or
undercorrect the actual value not to correspond to the default nominal value, or
overcorrect the actual value not to correspond to the default nominal value.

Typically the correction of the deviation corrects the actual value to correspond to the default nominal value.

In case the correction of the deviation would result in either an undercorrection or an overcorrection of the actual value the undercorrection or the overcorrection is distributed in equal parts. The distribution in equal parts is typically done as, while printing a spectacle lens in layers, a total volume of ink droplets to be positioned in a layer is equivalent to a volume of the layer.

When (i) positioning one volume element or more volume elements or (ii) not positioning one volume element or more volume elements according to the condition
a maximum distance between two adjacent volume elements in the layer, or
a maximum distance between two adjacent stacks of volume elements in the layer, or
a maximum distance between a volume element and an adjacent stack of volume elements in the layer
is considered. The maximum distance typically is a distance corresponding to a distance allowing a coalescence of ink droplets. The ink droplets, inkjet printed a) as two adjacent ink droplets or b) as two adjacent stacks of ink droplets or c) as an ink droplet adjacent to a stack of ink droplets, typically after coalescence form a continuous layer.

Further, when (i) positioning one volume element or more volume elements or (ii) not positioning one volume element or more volume elements according to the condition
a variation in a distance between two adjacent volume elements in the layer, or
a variation in a distance between two adjacent stacks of volume elements in the layer, or
a variation in a distance between a volume element and an adjacent stack of volume elements in the layer
typically is minimized. When inkjet printing a spectacle lens in layers considering the minimized variation in a distance between two adjacent ink droplets in a layer, or
between two adjacent stacks of ink droplets in a layer, or
between an ink droplet and an adjacent stack of ink droplets in a layer
typically enables a smoothest possible surface of the layer.

In an exemplary embodiment of the disclosure, the computer-implemented method is further characterized by one of the following additional steps selected from:
determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the positioning of a volume element and distributing the deviation to an adjacent discrete $x_{o+1}$, $y_{o+1}$, $z_{o+1}$ ... $x_{p+1}$, $y_{p+1}$, $z_{p+1}$ position within the identical layer;
determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the positioning of a volume element and transferring the deviation to a discrete $x_{m+2}$, $y_{m+2}$, $z_{m+2}$ ... $x_{n+2}$, $y_{n+2}$, $z_{n+2}$ position of the next but one layer;
determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the non-positioning of a volume element and distributing the deviation to an adjacent discrete $x_{o+1}$, $y_{o+1}$, $z_{o+1}$ $x_{p+1}$, $y_{p+1}$, $z_{p+1}$ position within the identical layer;
determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the non-positioning of a volume element and transferring the deviation to a discrete $x_{m+2}$, $y_{m+2}$, $z_{m+2}$ $x_{n+2}$, $y_{n+2}$, $z_{n+2}$ position of the next but one layer.

A discrete $x_{o+1}$, $y_{o+1}$, $z_{o+1}$ ... $x_{p+1}$, $y_{p+1}$, $z_{p+1}$ position is adjacent to a discrete $x_{m+1}$, $y_{m+1}$, $z_{m+1}$ ... $x_{n+1}$, $y_{n+1}$, $z_{n+1}$ position within in a same layer. A discrete $x_{m+2}$, $y_{m+2}$, $z_{m+2}$ ... $x_{n+2}$, $y_{n+2}$, $z_{n+2}$ position of a next but one layer is directly adjacent and on top of a discrete $x_{m+1}$, $y_{m+1}$, $z_{m+1}$ ... $x_{n+1}$, $y_{n+1}$, $z_{n+1}$ position of a layer.

In case the layer is a final layer of the layer stack then the transferring of the deviation is only possible within the final layer.

As described before, the volume elements may be represented as cuboids with preset edge lengths, and typically are represented as cubes of a preset edge length and the layer thickness in each discrete x,y,z position of each layer is preset by slicing a digital twin of a spectacle lens into a layer stack.

Subsequently to a
- (i) positioning of one volume element or more volume elements in a discrete $x_{m+1}$, $y_{m+1}$, $z_{m+1}$ ... $x_{n+1}$, $y_{n+1}$, $z_{n+1}$ position(s) of the layer, or
- (ii) not positioning of one volume element or more volume elements in a discrete $x_{m+1}$, $y_{m+1}$, $z_{m+1}$ ... $x_{n+1}$, $y_{n+1}$, $z_{n+1}$ position(s) of the layer, an actual value of a layer thickness in a discrete $x_{m+1}$, $y_{m+1}$, $z_{m+1}$ ... $x_{n+1}$, $y_{n+1}$, $z_{n+1}$ position of the layer is determined and compared to a default nominal value of the layer thickness a discrete $x_{m+1}$, $y_{m+1}$, $z_{m+1}$ ... $x_{n+1}$, $y_{n+1}$, $z_{n+1}$ position of the layer. A deviation from the default nominal value is
distributed to an adjacent discrete $x_{o+1}$, $y_{o+1}$, $z_{o+1}$ ... $x_{p+1}$, $y_{p+1}$, $z_{p+1}$ position within the identical layer, and
transferred to a discrete $x_{m+2}$, $y_{m+2}$, $z_{m+2}$ ... $x_{n+2}$, $y_{n+2}$, $z_{n+2}$ position of a next but one layer.

Distributing the deviation to one adjacent discrete $x_{o+1}$, $y_{o+1}$, $z_{o+1}$ ... $x_{p+1}$, $y_{p+1}$, $z_{p+1}$ position or more adjacent $x_{o1+1}$, $y_{o1+1}$, $z_{o1+1}$ ... $x_{p1+1}$, $y_{p1+1}$, $z_{p1+1}$ positions shall mean that when determining an actual layer thickness in the discrete $x_{o+1}, y_{o+1}, z_{o+1} \ldots x_{p+1}, y_{p+1}, z_{p+1}$ position or in the discrete $x_{o1+1}, y_{o1+1}, z_{o1+1} \ldots x_{p1+1}, y_{p1+1}, z_{p1+1}$ positions the deviation is considered. In case the actual value of the layer thickness in the discrete $x_{m+1}, y_{m+1}, z_{m+1} \ldots x_{n+1}, y_{n+1}, z_{n+1}$ position of the layer is smaller than the default nominal value of the layer thickness in the a discrete $x_{m+1}, y_{m+1}, z_{m+1} \ldots x_{n+1}, y_{n+1}, z_{n+1}$ position then the deviation is considered for example in that in an adjacent discrete $x_{o+1}, y_{o+1}, z_{o+1} \ldots x_{p+1}, y_{p+1}, z_{p+1}$ position the difference in layer thickness is added to an actual layer thickness in the adjacent discrete $x_{o+1}, y_{o+1}, z_{o+1} \ldots x_{p+1}, y_{p+1}, z_{p+1}$ position. In case the actual value of the layer thickness in the discrete $x_{m+1}, y_{m+1}, z_{m+1} \ldots x_{n+1}, y_{n+1}, z_{n+1}$ position of the layer is larger than the default nominal value of the layer thickness in the a discrete $x_{m+1}, y_{m+1}, z_{m+1} \ldots x_{n+1}, y_{n+1}, z_{n+1}$ position then the deviation is considered for example in that in an adjacent discrete $x_{o+1}, y_{o+1}, z_{o+1} \ldots x_{p+1}, y_{p+1}, z_{p+1}$ position the difference in layer thickness is subtracted from an actual layer thickness in the adjacent discrete $x_{o+1}, y_{o+1}, z_{o+1} \ldots x_{p+1}, y_{p+1}, z_{p+1}$ position. In case the actual value of the layer thickness in the discrete $x_{m+1}, y_{m+1}, z_{m+1} \ldots x_{n+1}, y_{n+1}, z_{n+1}$ position of the layer is equal to the default nominal value of the layer thickness in the a discrete $x_{m+1}, y_{m+1}, z_{m+1} \ldots x_{n+1}, y_{n+1}, z_{n+1}$ position no transferring is needed.

Subsequently to the before described distribution of the deviation the computer-implemented method continues with and applies the step in the adjacent discrete $x_{o+1}, y_{o+1}, z_{o+1} \ldots x_{p+1}, y_{p+1}, z_{p+1}$ position, i.e., an actual value of a layer thickness in the discrete $x_{o+1}, y_{o+1}, z_{o+1} \ldots x_{p+1}, y_{p+1}, z_{p+1}$ position of the layer is determined and compared to a default nominal value of the layer thickness a discrete $x_{o+1}, y_{o+1}, z_{o+1} \ldots x_{p+1}, y_{p+1}, z_{p+1}$ position of the layer. A deviation from the default nominal value is distributed to an adjacent discrete $x_{q+1}, y_{q+1}, z_{q+1} \ldots x_{r+1}, y_{r+1}, z_{r+1}$ position within the identical layer, and transferred to a discrete $x_{m+2}, y_{m+2}, z_{m+2} \ldots x_{n+2}, y_{n+2}, z_{n+2}$ position of a next but one layer.

The determination is continued until a deviation of an actual layer value of a thickness from a default nominal value of the layer thickness is determined for each discrete $x_{m+1}, y_{m+1}, z_{m+1} \ldots x_{n+1}, y_{n+1}, z_{n+1}$ position of the layer.

A sum of the deviation and the considered deviation distributed in a layer typically is zero to ensure that in an inkjet printed lens a total volume of ink droplets is equivalent to a volume of a layer to be inkjet printed.

Transferring the deviation to a discrete $x_{m+2}, y_{m+2}, z_{m+2} \ldots x_{n+2}, y_{n+2}, z_{n+2}$ position of a next but one layer shall mean that the deviation is considered in the next but one layer to typically position a volume element in the next but one layer in a discrete $x_{m+2b}, y_{m+2b}, z_{m+2b} \ldots x_{n+2b}, y_{n+2b}, z_{n+2b}$ position not on top of a volume element in a discrete $x_{m+1}, y_{m+1}, z_{m+1} \ldots x_{n+1}, y_{n+1}, z_{n+1}$ position of the layer. Thus, the transferring contributes to achieve a smoothest possible (i) interface of a spectacle lens or (ii) surface of a spectacle when the spectacle lens is inkjet printed in layers and ink droplets are positioned according to the positioning of volume elements a discrete $x_{m+2b}, y_{m+2b}, z_{m+2b} \ldots x_{n+2b}, y_{n+2b}, z_{n+2b}$ position.

The computer-implemented method being configured for calculating a digital twin of a spectacle lens for the purpose of a use of the digital twin for a manufacture of the spectacle lens, the digital twin having a front surface and a back surface, is characterized in the step of:

calculating a total number of volume elements between each discrete $z_{front}(x,y)$ position of the front surface and a respective discrete $z_{back}(x,y)$ position of the back surface, the calculation resulting in a volume element density distribution of the digital twin.

In a digital twin of a spectacle lens a distance of each discrete $z(x,y)$ position of a front surface to a respective $z(x,y)$ position of a back surface typically is preset. For a respective distance in each discrete $z(x,y)$ position between the front surface and the back surface the two discrete $z(x,y)$ positions of the front surface and the back surface differ in their respective z position only. Phased differently, the distance between a discrete $z(x,y)$ position of a front surface and a respective $z(x,y)$ position of a back surface is a distance between positions having identical discrete x and y positions on the respective surface but having different z positions on the respective surface. A total number of volume elements for each respective distance between the front surface and the back surface of the digital twin, may be calculated by dividing a lens thickness at a (x,y) position by a respective thickness of a fully printed layer. Typically, with respect to the preset distance in each discrete $z(x,y)$ position between the front and the back surface, i.e., an absolute value of $z_{back}(x,y)$ minus $z_{front}(x,y)$, a volume of one volume element, an area of the one volume element, usually depending on a printing resolution of an inkjet printer, typically a printhead of the inkjet printer, the total number of volume elements is calculated as product of the preset distance and the area of the one volume element divided by the volume of the one volume element:

$$\text{Total number of volume elements} = \frac{\text{distance} \times \text{area of volume element}}{\text{volume of volume element}}$$

Having calculated the total number of volume elements for each distance between a front surface and a back surface of a digital twin results in a volume element density distribution of the digital twin. The volume element density distribution is a suitable basis for slicing the digital twin.

The computer-implemented method is suitable for generating printing instructions for inkjet printing a spectacle lens. The computer-implemented method is suitable for the purpose of generating printing instructions, the printing instructions to be used for inkjet printing a spectacle lens.

Typically, the method being configured for calculating the digital twin of the spectacle lens for the purpose of a use of the digital twin for the manufacture of the spectacle lens, the digital twin having the front surface and the back surface, is characterized in the step of:

determining the layer stack to comprise a minimum number of layers based on a calculated maximum total number of volume elements between a discrete x,y,z position of the front surface and a respective discrete x,y,z position of the back surface.

Typically, the digital twin is sliced such that a minimum number of layers at a maximum distance between a front surface and a back surface is determined. Under the assumption of an identical volume and an identical area of volume elements a maximum distance between a front surface and a back surface of a digital twin corresponds to a calculated maximum total number of volume elements.

Typically, the method being configured for calculating the digital twin of the spectacle lens for the purpose of a use of the digital twin for the manufacture of the spectacle lens, the digital twin having the front surface and the back surface, is characterized in the step of:

uniformly distributing volume elements based on the calculated total number of volume elements
in z direction of each respective x,y,z position, and
in x,y direction of each layer of the layer stack.

Uniformly distributing volume elements in the knowledge of the calculated total number of volume elements and the minimum number of layers of the layer stack typically comprises that in z direction between two respective x,y,z positions a front surface and on a back surface when the total number of volume elements is smaller than the minimum number of layers not the total number volume elements is distributed in subsequent layers of the layer stack but that the total number of volume elements is distributed throughout the minimum number of layers. A resulting spatial volume pattern is then the basis for inkjet printing a spectacle lens.

Typically, the method being configured for calculating the digital twin of the spectacle lens for the purpose of a use of the digital twin for the manufacture of the spectacle lens, the digital twin having the front surface and the back surface, is characterized in that each layer of the layer stack is having an identical spatial expansion when projected in a plane held by an x direction and a y direction.

Typically, an identical spatial expansion of all layers of a layer of a digital twin has the decisive advantage that in an inkjet printed spectacle lens, typically inkjet printed according to a spatial volume element pattern resulting from any one of the before described volume element positionings or not positionings, has the inherent superelevations described in WO 2021/209551 A1, for example on page 1, lines 25 to 28, were transferred to an edge of the printed spectacle lens. If necessary, such an edge with added up superelevations may be just cut off.

The computer-implemented methods described before are further configured to manufacture the spectacle lens based on the digital twin of the spectacle lens.

A Computer according to the disclosure is configured to perform the step of:
  determining a volume element positioning in a layer of a layer stack of a digital twin in that
    (i) a positioning a volume element in a discrete $x_{m+1}, y_{m+1}, z_{m+1} \ldots x_{n+1}, y_{n+1}, z_{n+1}$ position of a layer of the layer stack is based on a positioning of a volume element in a discrete $x_m, y_m, z_m \ldots x_n, y_n, z_n$ position of an adjacent layer of the layer stack, or
    (ii) a not positioning a volume element in a discrete $x_{m+1}, y_{m+1}, z_{m+1} \ldots x_{n+1}, y_{n+1}, z_{n+1}$ position of a layer of the layer stack is based on a positioning of a volume element in a discrete $x_m, y_m, z_m \ldots x_n, y_n, z_n$ position of an adjacent layer of the layer stack,
  the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer, following the condition:
  when in 50% or in less than 50% of discrete $x_m, y_m, z_m \ldots x_n, y_n, z_n$ positions of the adjacent layer a volume element is positioned, then no volume element is positioned in discrete $x_{m+1}, y_{m+1}, z_{m+1} \ldots x_{n+1}, y_{n+1}, z_{n+1}$ positions of the layer;
  when in more than 50% of discrete $x_m, y_m, z_m \ldots x_n, y_n, z_n$ positions of the adjacent layer a volume element is positioned, then volume elements are positioned partially in discrete $x_{m+1}, y_{m+1}, z_{m+1} \ldots x_{n+1}, y_{n+1}, z_{n+1}$ positions of the layer,
and an inkjet printer printing a spectacle lens according to the condition.

A data processing system according to the disclosure comprises a processor and a storage medium coupled to the processor, wherein the processor is adapted to perform the steps:
  (i) positioning a volume element in a discrete $x_{m+1}, y_{m+1}, z_{m+1} \ldots x_{n+1}, y_{n+1}, z_{n+1}$ position of a layer of a layer stack, based on a positioning of a volume element in a discrete $x_m, y_m, z_m \ldots x_n, y_n, z_n$ position of an adjacent layer of the layer stack, or
  (ii) not positioning a volume element in a discrete $x_{m+1}, y_{m+1}, z_{m+1} \ldots x_{n+1}, y_{n+1}, z_{n+1}$ position of a layer of a layer stack, based on a positioning of a volume element in a discrete $x_m, y_m, z_m \ldots x_n, y_n, z_n$ position of an adjacent layer of the layer stack,
the data processing system being configured for the purpose of a use thereof for inkjet printing a spectacle lens in layers.

The processor adapted to perform above mentioned steps may be based on a computer program stored on a storage medium. The storage medium may be a non-transitory tangible computer-readable storage medium.

In an exemplary embodiment, the data processing system comprises a processor and a storage medium coupled to the processor is adapted to perform the step according to one of the following conditions:
  when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions;
  when in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions.

In an exemplary embodiment, the data processing system comprises a processor and a storage medium coupled to the processor is adapted to perform a step according to one of the following conditions:
  when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions and volume elements are positioned in each of a discrete $x_{m+2}, y_{m+2}, z_{m+2} \ldots x_{n+2}, y_{n+2}, z_{n+2}$ positions of a next but one layer of the layer stack;
  when in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions and volume elements are positioned partially in discrete $x_{m+2}, y_{m+2}, z_{m+2} \ldots x_{n+2}, y_{n+2}, z_{n+2}$ positions of a next but one layer of the layer stack.

In an exemplary embodiment, the data processing system comprises a processor and a storage medium coupled to the processor is adapted to perform a step according to one of the following conditions:
  when in 50% or more than 50% of the discrete $x_{m+2}, y_{m+2}, z_{m+2} \ldots x_{n+2}, y_{n+2}, z_{n+2}$ positions and in 66% or less than 66% of the discrete $x_{m+2}, y_{m+2}, z_{m+2} \ldots x_{n+2}, y_{n+2}, z_{n+2}$ positions of the next but one layer a volume element is to be positioned, then the volume element is positioned as described before with respect to a computer-implemented method;
  when in more than 66% of discrete $x_{m+3}, y_{m+3}, z_{m+3} \ldots x_{n+3}, y_{n+3}, z_{n+3}$ positions and in 75% or less than 75% of the discrete $x_{m+3}, y_{m+3}, z_{m+3} x_{n+3}, y_{n+3}, z_{n+3}$ positions of an adjacent layer to the next but one layer a volume element is to be positioned, then the volume element is positioned as described before with respect to a computer-implemented method;

when in more than 75% of discrete $x_{m+4}, y_{m+4}, z_{m+4} \ldots x_{n+4}, y_{n+4}, z_{n+4}$ positions and in less than 80% of the discrete $x_{m+4}, y_{m+4}, z_{m+4} \ldots x_{n+4}, y_{n+4}, z_{n+4}$ positions of a layer separated by three layers from the adjacent layer, i.e., of a layer being separated by the layer, the next but one layer, the adjacent layer to the next but one layer from the adjacent layer, a volume element is to be positioned, then the volume element is positioned as described before with respect to a computer-implemented method.

In an exemplary embodiment, the data processing system comprises a processor and a storage medium coupled to the processor is adapted to perform an additional step:

(iii) determining a deviation of an actual value of a layer thickness in a discrete $x_m, y_m, z_m \ldots x_n, y_n, z_n$ position of the adjacent layer from a default nominal value of the layer thickness in an identical discrete $x_m, y_m, z_m \ldots x_n, y_n, z_n$ position of the adjacent layer.

In an exemplary embodiment, the data processing system comprises a processor and a storage medium coupled to the processor is adapted to perform an additional step:

(iv) determining a sum of the deviation and the actual value of the layer thickness.

In an exemplary embodiment, the data processing system comprises a processor and a storage medium coupled to the processor is adapted to perform a step according to one of the following conditions:

when the sum is larger than half the default nominal value of the layer thickness then no volume element is positioned in a discrete $x_{m+1}, y_{m+1}, z_{m+1} \ldots x_{n+1}, y_{n+1}, z_{n+1}$ position of the layer of the layer stack;

when the sum is smaller than or equal to half the default nominal value of the layer thickness then a volume element is positioned in a discrete $x_{m+1}, y_{m+1}, z_{m+1} \ldots x_{n+1}, y_{n+1}, z_{n+1}$ position of the layer of the layer stack.

In an exemplary embodiment, the data processing system comprises a processor and a storage medium coupled to the processor is adapted to perform one of the additional steps selected from:

determining a deviation of a default nominal value of a layer thickness in the discrete $x_{m+1}, y_{m+1}, z_{m+1} \ldots x_{n+1}, y_{n+1}, z_{n+1}$ position of the layer following the positioning of a volume element and distributing the deviation to an adjacent discrete $x_{o+1}, y_{o+1}, z_{o+1} \ldots x_{p+1}, y_{p+1}, z_{p+1}$ position within the identical layer;

determining a deviation of a default nominal value of a layer thickness in the discrete $x_{m+1}, y_{m+1}, z_{m+1} \ldots x_{n+1}, y_{n+1}, z_{n+1}$ position of the layer following the positioning of a volume element and transferring the deviation to a discrete $x_{m+2}, y_{m+2}, z_{m+2} \ldots x_{n+2}, y_{n+2}, z_{n+2}$ position of the next but one layer;

determining a deviation of a default nominal value of a layer thickness in the discrete $x_{m+1}, y_{m+1}, z_{m+1} \ldots x_{n+1}, y_{n+1}, z_{n+1}$ position of the layer following the non-positioning of a volume element and distributing the deviation to an adjacent discrete $x_{o+1}, y_{o+1}, z_{o+1} \ldots x_{p+1}, y_{p+1}, z_{p+1}$ position within the identical layer;

determining a deviation of a default nominal value of a layer thickness in the discrete $x_{m+1}, y_{m+1}, z_{m+1} \ldots x_{n+1}, y_{n+1}, z_{n+1}$ position of the layer following the non-positioning of a volume element and transferring the deviation to a discrete $x_{m+2}, y_{m+2}, z_{m+2} \ldots x_{n+2}, y_{n+2}, z_{n+2}$ position of the next but one layer.

With respect to the data processing system the before with respect to a computer-implemented method given definitions shall apply. The data processing system is replaceable by a computer and an inkjet printer, in this case the before with respect to a computer-implemented method given definitions shall also apply.

In an exemplary embodiment, the disclosure comprises a computer program, the computer program comprises instructions which, when the program is executed by a computer, cause the computer to carry out the above-described computer-implemented method.

The computer program may be stored on a non-transitory tangible computer-readable storage medium, the computer program comprising instructions which, when the program is executed by a computer, cause the computer to carry out the above-described computer-implemented method.

In an exemplary embodiment, the disclosure comprises a computer-readable storage medium having stored thereon the computer program. The computer-readable storage medium may be a non-transitory tangible computer-readable storage medium.

In an exemplary embodiment, the disclosure comprises a data signal carrying the computer program.

A data set of computer-readable printing instructions according to the disclosure is configured to be used for inkjet printing a spectacle lens, the data set being (i) stored on a computer-readable storage medium or (ii) transferred via a data signal. The data set is for the purpose of a use thereof for inkjet printing a spectacle lens.

The data set comprise printing instructions which have been generated as described before.

An inkjet printer according to the disclosure comprises a processor configured to cause an inkjet print head A) to release a jet forming an ink droplet in a discrete $x_{m+1}, y_{m+1}, z_{m+1} \ldots x_{n+1}, y_{n+1}, z_{n+1}$ position of a layer, or B) not to release a jet forming an ink droplet in a discrete $x_{m+1}, y_{m+1}, z_{m+1} \ldots x_{n+1}, y_{n+1}, z_{n+1}$ position of a layer for inkjet printing a spectacle lens in layers, the release or the not release being based on an ink droplet positioning in a discrete $x_m, y_m, z_m \ldots x_n, y_n, z_n$ position of an adjacent layer.

The (A) release or (B) not release is completed when the spectacle lens is finished inkjet printed.

In an exemplary embodiment, the inkjet printer is configured to comprise a step according to one of the following conditions:

when in less than 50% of the discrete $x_m, y_m, z_m \ldots x_n, y_n, z_n$ positions an ink droplet is positioned, then no ink droplet is positioned in each of the discrete $x_{m+1}, y_{m+1}, z_{m+1} \ldots x_{n+1}, y_{n+1}, z_{n+1}$ positions;

when in 50% or more than 50% of the discrete $x_m, y_m, z_m \ldots x_n, y_n, z_n$ positions an ink droplet is positioned, then ink droplets are positioned partially in the discrete $x_{m+1}, y_{m+1}, z_{m+1} \ldots x_{n+1}, y_{n+1}, z_{n+1}$ positions.

In an exemplary embodiment, the inkjet printer is configured to comprise a step according to one of the following conditions:

when in less than 50% of the discrete $x_m, y_m, z_m \ldots x_n, y_n, z_n$ positions an ink droplet is positioned, then no ink droplet is positioned in each of the discrete $x_{m+1}, y_{m+1}, z_{m+1} \ldots x_{n+1}, y_{n+1}, z_{n+1}$ positions and ink droplets are positioned in each of a discrete $x_{m+2}, y_{m+2}, z_{m+2} \ldots x_{n+2}, y_{n+2}, z_{n+2}$ positions of a next but one layer of the layer stack;

when in 50% or more than 50% of the discrete $x_m, y_m, z_m \ldots x_n, y_n, z_n$ positions an ink droplet is positioned, then ink droplets are positioned partially in the discrete $x_{m+1}, y_{m+1}, z_{m+1} \ldots x_{n+1}, y_{n+1}, z_{n+1}$ positions and ink droplets are positioned partially in discrete $x_{m+2}$, $y_{m+2}$, $z_{m+2}$ ... $x_{n+2}$, $y_{n+2}$, $z_{n+2}$ positions of a next but one layer of the layer stack.

In an exemplary embodiment, the inkjet printer is configured to comprise a step according to one of the following conditions:
- when in 50% or more than 50% of the discrete $x_{m+2}$, $y_{m+2}$, $z_{m+2}$ ... $x_{n+2}$, $y_{n+2}$, $z_{n+2}$ positions and in 66% or less than 66% of the discrete $x_{m+2}$, $y_{m+2}$, $z_{m+2}$ ... $x_{n+2}$, $y_{n+2}$, $z_{n+2}$ positions of the next but one layer an ink droplet is to be positioned, then the ink droplet is positioned as described before with respect to a computer-implemented method;
- when in more than 66% of discrete $x_{m+3}$, $y_{m+3}$, $z_{m+3}$ ... $x_{n+3}$, $y_{n+3}$, $z_{n+3}$ positions and in 75% or less than 75% of the discrete $x_{m+3}$, $y_{m+3}$, $z_{m+3}$ ... $x_{n+3}$, $y_{n+3}$, $z_{n+3}$ positions of an adjacent layer to the next but one layer an ink droplet is to be positioned, then the ink droplet is positioned as described before with respect to a computer-implemented method;
- when in more than 75% of discrete $x_{m+4}$, $y_{m+4}$, $z_{m+4}$ ... $x_{n+4}$, $y_{n+4}$, $z_{n+4}$ positions and in less than 80% of the discrete $x_{m+4}$, $y_{m+4}$, $z_{m+4}$ ... $x_{n+4}$, $y_{n+4}$, $z_{n+4}$ positions of a layer separated by three layers from the adjacent layer, i.e., of a layer being separated by the layer, the next but one layer, the adjacent layer to the next but one layer from the adjacent layer, an ink droplet is to be positioned, then the ink droplet is positioned as described before with respect to a computer-implemented method.

In an exemplary embodiment, the inkjet printer is configured to comprise an additional step:
(C) determining a deviation of an actual value of a layer thickness in a discrete $x_m$, $y_m$, $z_m$ ... $x_n$, $y_n$, $z_n$ position of the adjacent layer from a default nominal value of the layer thickness in an identical discrete $x_m$, $y_m$, $z_m$ ... $x_n$, $y_n$, $z_n$ position of the adjacent layer.

In an exemplary embodiment, the inkjet printer is configured to comprise an additional step:
(D) determining a sum of the deviation and the actual value of the layer thickness.

In an exemplary embodiment, the inkjet printer is configured to comprise a step according to one of the following conditions:
- when the sum is larger than half the default nominal value of the layer thickness then no ink droplet is positioned in a discrete $x_{m+1}$, $y_{m+1}$, $z_{m+1}$ ... $x_{n+1}$, $y_{n+1}$, $z_{n+1}$ position of the layer of the layer stack;
- when the sum is smaller than or equal to half the default nominal value of the layer thickness then an ink droplet is positioned in a discrete $x_{m+1}$, $y_{m+1}$, $z_{m+1}$ ... $x_{n+1}$, $y_{n+1}$, $z_{n+1}$ position of the layer of the layer stack.

In an exemplary embodiment, the inkjet printer is configured to comprise one of the additional steps selected from:
- determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the positioning of an ink droplet and distributing the deviation to an adjacent discrete $x_{o+1}$, $y_{o+1}$, $z_{o+1}$ ... $x_{p+1}$, $y_{p+1}$, $z_{p+1}$ position within the identical layer;
- determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the positioning of an ink droplet and transferring the deviation to a discrete $x_{m+2}$, $y_{m+2}$, $z_{m+2}$ ... $x_{n+2}$, $y_{n+2}$, $z_{n+2}$ position of the next but one layer;
- determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the non-positioning of an ink droplet and distributing the deviation to an adjacent discrete $x_{o+1}$, $y_{o+1}$, $z_{o+1}$ ... $x_{p+1}$, $y_{p+1}$, $z_{p+1}$ position within the identical layer;
- determining a deviation of a default nominal value of a layer thickness in the discrete $x_{m+1}$, $y_{m+1}$, $z_{m+1}$ ... $x_{n+1}$, $y_{n+1}$, $z_{n+1}$ position of the layer following the non-positioning of an ink droplet and transferring the deviation to a discrete $x_{m+2}$, $y_{m+2}$, $z_{m+2}$ ... $x_{n+2}$, $y_{n+2}$, $z_{n+2}$ position of the next but one layer.

With respect to the inkjet printer the before with respect to a computer-implemented method given definitions shall apply.

A method for inkjet printing a spectacle lens in layers according to the disclosure comprises one of the following steps:
a) positioning an ink droplet in a discrete $x_{m+1}$, $y_{m+1}$, $z_{m+1}$ ... $x_{n+1}$, $y_{n+1}$, $z_{n+1}$ position of a layer, based on a positioning of an ink droplet in an adjacent layer in a discrete $x_m$, $y_m$, $z_m$ ... $x_n$, $y_n$, $z_n$ position, or
b) not positioning an ink droplet in a discrete $x_{m+1}$, $y_{m+1}$, $z_{m+1}$ ... $x_{n+1}$, $y_{n+1}$, $z_{n+1}$ position of a layer, based on a positioning of an ink droplet in an adjacent layer in a discrete $x_m$, $y_m$, $z_m$ ... $x_n$, $y_n$, $z_n$ position.

According to the method the (a) positioning or (b) the not positioning is completed when the spectacle lens is finished being inkjet printed.

In an exemplary embodiment, the method comprises a step according to one of the following conditions:
- when in less than 50% of the discrete $x_m$, $y_m$, $z_m$ ... $x_n$, $y_n$, $z_n$ positions an ink droplet is positioned, then no ink droplet is positioned in each of the discrete $x_{m+1}$, $y_{m+1}$, $z_{m+1}$ ... $x_{n+1}$, $y_{n+1}$, $z_{n+1}$ positions;
- when in 50% or more than 50% of the discrete $x_m$, $y_m$, $z_m$ ... $x_n$, $y_n$, $z_n$ positions an ink droplet is positioned, then ink droplets are positioned partially in the discrete $x_{m+1}$, $y_{m+1}$, $z_{m+1}$ ... $x_{n+1}$, $y_{n+1}$, $z_{n+1}$ positions.

In an exemplary embodiment, the method comprises a step according to one of the following conditions:
- when in less than 50% of the discrete $x_m$, $y_m$, $z_m$ ... $x_n$, $y_n$, $z_n$ positions an ink droplet is positioned, then no ink droplet is positioned in each of the discrete $x_{m+1}$, $y_{m+1}$, $z_{m+1}$ ... $x_{n+1}$, $y_{n+1}$, $z_{n+1}$ positions and ink droplets are positioned in each of a discrete $x_{m+2}$, $y_{m+2}$, $z_{m+2}$ ... $x_{n+2}$, $y_{n+2}$, $z_{n+2}$ positions of a next but one layer of the layer stack;
- when in 50% or more than 50% of the discrete $x_m$, $y_m$, $z_m$ ... $x_n$, $y_n$, $z_n$ positions an ink droplet is positioned, then ink droplets are positioned partially in the discrete $x_{m+1}$, $y_{m+1}$, $z_{m+1}$ ... $x_{n+1}$, $y_{n+1}$, $z_{n+1}$ positions and ink droplets are positioned partially in discrete $x_{m+2}$, $y_{m+2}$, $z_{m+2}$ ... $x_{n+2}$, $y_{n+2}$, $z_{n+2}$ positions of a next but one layer of the layer stack.

In an exemplary embodiment, the method comprises a step according to one of the following conditions:
- when in 50% or more than 50% of the discrete $x_{m+2}$, $y_{m+2}$, $z_{m+2}$ ... $x_{n+2}$, $y_{n+2}$, $z_{n+2}$ positions and in 66% or less than 66% of the discrete $x_{m+2}$, $y_{m+2}$, $z_{m+2}$ ... $x_{n+2}$, $y_{n+2}$, $z_{n+2}$ positions of the next but one layer an ink droplet is to be positioned, then the ink droplet is positioned as described before with respect to a computer-implemented method;
- when in more than 66% of discrete $x_{m+3}$, $y_{m+3}$, $z_{m+3}$ ... $x_{n+3}$, $y_{n+3}$, $z_{n+3}$ positions and in 75% or less than 75% of the discrete $x_{m+3}$, $y_{m+3}$, $z_{m+3}$ ... $x_{n+3}$, $y_{n+3}$, $z_{n+3}$ positions of an adjacent layer to the next but one layer an ink droplet is to be positioned, then the ink droplet is positioned as described before with respect to a computer-implemented method;

when in more than 75% of discrete $x_{m+4}, y_{m+4}, z_{m+4} \ldots x_{n+4}, y_{n+4}, z_{n+4}$ positions and in less than 80% of the discrete $x_{m+4}, y_{m+4}, z_{m+4} \ldots x_{n+4}, y_{n+4}, z_{n+4}$ positions of a layer separated by three layers from the adjacent layer, i.e., of a layer being separated by the layer, the next but one layer, the adjacent layer to the next but one layer from the adjacent layer, an ink droplet is to be positioned, then the ink droplet is positioned as described before with respect to a computer-implemented method.

In an exemplary embodiment, the method comprises an additional step:

(c) determining a deviation of an actual value of a layer thickness in a discrete $x_m, y_m, z_m \ldots x_n, y_n, z_n$ position of the adjacent layer from a default nominal value of the layer thickness in an identical discrete $x_m, y_m, z_m \ldots x_n, y_n, z_n$ position of the adjacent layer.

In an exemplary embodiment, the method comprises an additional step:

(d) determining a sum of the deviation and the actual value of the layer thickness.

In an exemplary embodiment, the method comprises a step according to one of the following conditions:

when the sum is larger than half the default nominal value of the layer thickness then no ink droplet is positioned in a discrete $x_{m+1}, y_{m+1}, z_{m+1} \ldots x_{n+1}, y_{n+1}, z_{n+1}$ position of the layer of the layer stack;

when the sum is smaller than or equal to half the default nominal value of the layer thickness then an ink droplet is positioned in a discrete $x_{m+1}, y_{m+1}, z_{m+1} \ldots x_{n+1}, y_{n+1}, z_{n+1}$ position of the layer of the layer stack.

In an exemplary embodiment, the method comprises one of the additional steps selected from:

determining a deviation of a default nominal value of a layer thickness in the discrete $x_{m+1}, y_{m+1}, z_{m+1} \ldots x_{n+1}, y_{n+1}, z_{n+1}$ position of the layer following the positioning of an ink droplet and distributing the deviation to an adjacent discrete $x_{o+1}, y_{o+1}, z_{o+1} \ldots x_{p+1}, y_{p+1}, z_{p+1}$ position within the identical layer;

determining a deviation of a default nominal value of a layer thickness in the discrete $x_{m+1}, y_{m+1}, z_{m+1} \ldots x_{n+1}, y_{n+1}, z_{n+1}$ position of the layer following the positioning of an ink droplet and transferring the deviation to a discrete $x_{m+2}, y_{m+2}, z_{m+2} \ldots x_{n+2}, y_{n+2}, z_{n+2}$ position of the next but one layer;

determining a deviation of a default nominal value of a layer thickness in the discrete $x_{m+1}, y_{m+1}, z_{m+1} \ldots x_{n+1}, y_{n+1}, z_{n+1}$ position of the layer following the non-positioning of an ink droplet and distributing the deviation to an adjacent discrete $x_{o+1}, y_{o+1}, z_{o+1} \ldots x_{p+1}, y_{p+1}, z_{p+1}$ position within the identical layer;

determining a deviation of a default nominal value of a layer thickness in the discrete $x_{m+1}, y_{m+1}, z_{m+1} \ldots x_{n+1}, y_{n+1}, z_{n+1}$ position of the layer following the non-positioning of an ink droplet and transferring the deviation to a discrete $x_{m+2}, y_{m+2}, z_{m+2} \ldots x_{n+2}, y_{n+2}, z_{n+2}$ position of the next but one layer.

With respect to the method the before with respect to a computer-implemented method given definitions shall apply.

In an exemplary embodiment of the disclosure, a spatial expansion of the layer and the adjacent layer is identical.

An identical spatial expansion means that the layer and the adjacent layer when projected in a plane held by an x direction and a y direction, in plan view, is of identical dimensions. For example, when each layer and the adjacent layer when projected in a plane held by an x direction and a y direction, in plan view, results in results in a circle, a radius of each layer resulting in the circle is identical. Being of identical dimensions does not necessarily mean that, when projected in a plane held by an x direction and a y direction, in plan view, at every point of a perimeter of the projection an ink droplet must be placed. However, the perimeter typically is the maximal spatial expansion each layer has.

The spatial expansion may be either a spatial expansion for a spectacle lens for which an edging is intended, i.e., a spectacle lens corresponding to an uncut lens as defined in ISO 13666:2019(E), section 3.8.8, a finished lens prior to edging, or no edging is intended, i.e., a spectacle lens corresponding to an edged lens as defined in ISO 13666:2019(E), section 3.8.9, a finished lens edged to the final size and shape.

In an exemplary embodiment of the disclosure, an outermost of the adjacent layers is inkjet printed in or on a substrate, the substrate defining a lens surface of a front surface of the spectacle lens or a back surface of the spectacle lens.

In an exemplary embodiment of the disclosure, a total volume of ink droplets in each layer is preset.

A total volume of ink droplets being preset means that a total volume of ink is preset for each layer, i.e., the total volume is inkjet printed in a layer. No volume of the total volume is inkjet printed in another layer. The total volume of ink droplets to be positioned in a layer is equivalent to a volume of the layer.

FIG. 1 shows a flow chart of an exemplary embodiment of the computer-implemented method for calculating a digital twin of a spectacle lens, including the steps of: (101) determining a layer thickness, (102) determining a deviation from a default nominal value, (103) determining a sum, (104) determining if the sum is larger than the default nominal value, or (105) if the sum is less or equal to the default nominal value, (106) determining that no volume element is printed, (107) determining a volume element is printed, (108) determining a deviation from a default nominal value, (109) distributing the determined deviation, (110) transferring the distribution, and (111) determining a layer thickness in an adjacent discrete position.

Figure 2:
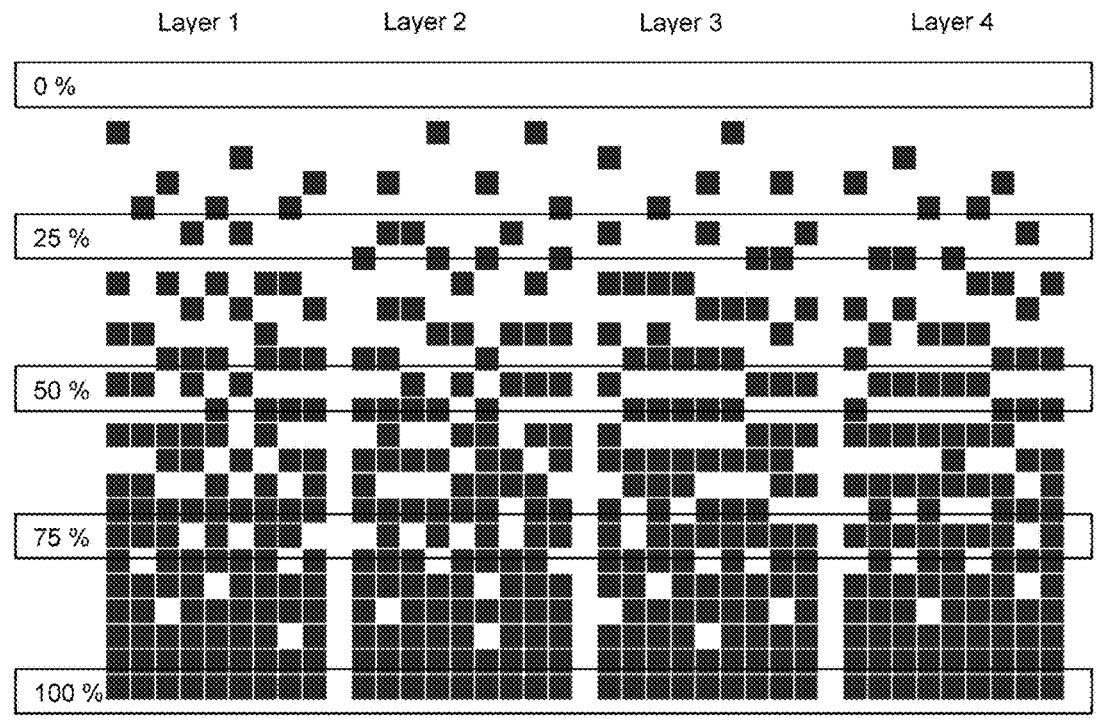
FIG. 2 shows the result of a positioning on a linear gradient structure.

FIG. 2 shows the result of a positioning on a linear gradient structure. In the upper part, the layer thickness is zero so that no volume elements are positioned, the volume elements representing ink droplets to be inkjet printed. In the lower part, all layers are to be inkjet printed with their maximum thickness so that all ink droplets are inkjet printed and all volume elements representing them positioned. In the 50% zone, the layer is to be inkjet printed with half of the maximum thickness so here only half of the ink droplets are to be inkjet printed and only half of the volume elements representing them positioned. The positioning of the volume elements in the second layer here is complementary to the positioning of the volume elements in the first layer. The positioning of the volume elements in the fourth layer here is complementary to the positioning of the volume elements in the second layer. The positioning of the volume elements in the third layer may not be complementary to the positioning of the volume elements in the second layer. This is because at this discrete position the deviation of the layer thickness of the first layer was already equilibrated by the opposing volume element positioning of the second layer. This means the volume elements in the third layer at this discrete position are mainly positioned here minimizing the distance variation to volume elements in the same layer.

In the 25% zone, one can observe that only one volume element is positioned at each position distributed over all four layers. In the 75% zone, one can observe that three volume elements are positioned at each position distributed over all four layers.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term comprising (and its grammatical variations) as used herein is used in the inclusive sense of having or including and not in the exclusive sense of consisting only of. The terms a and the as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for calculating a digital twin of a spectacle lens for a purpose of a use of the digital twin for a manufacture of the spectacle lens, the digital twin comprising a layer stack, wherein one of a following conditions for a dithering placement of a volume element applies:

when in 50% or in less than 50% of discrete $x_m, y_m, z_m \ldots x_n, y_n, z_n$ positions of an adjacent layer of the layer stack the volume element is positioned, then no volume element is positioned in discrete $x_{m+1}, y_{m+1}, z_{m+1} \ldots x_{n+1}, y_{n+1}, z_{n+1}$ positions of a layer of the layer stack, a discrete $x_{m+1}, y_{m+1}, z_{m+1} \ldots x_{n+1}, y_{n+1}, z_{n+1}$ position of the layer being directly adjacent and on top of a respective discrete $x_m, y_m, z_m \ldots x_n, y_n, z_n$ position of the adjacent layer;

when in more than 50% of discrete $x_m, y_m, z_m \ldots x_n, y_n, z_n$ positions of an adjacent layer of the layer stack a volume element is positioned, then volume elements are positioned in at least one of:

discrete $x_{m+1a \ldots z}, y_{m+1a \ldots z}, z_{m+1a \ldots z} \ldots x_{n+1a \ldots z}, y_{n+1a \ldots z}, z_{n+1a \ldots z}$ positions of a layer of the layer stack, a discrete $x_{m+1a \ldots z}, y_{m+1a \ldots z}, z_{m+1a \ldots z} \ldots x_{n+1a \ldots z}, y_{n+1a \ldots z}, z_{n+1a \ldots z}$ position of the layer not being directly adjacent and not being on top of a respective discrete $x_m, y_m, z_m \ldots x_n, y_n, z_n$ position of the adjacent layer, or discrete $x_{m+1}, y_{m+1}, z_{m+1} \ldots x_{n+1}, y_{n+1}, z_{n+1}$ positions of a layer of the layer stack, a discrete $x_{m+1}, y_{m+1}, z_{m+1} \ldots x_{n+1}, y_{n+1}, z_{n+1}$ position of the layer being directly adjacent and on top of a respective discrete $x_m, y_m, z_m \ldots x_n, y_n, z_n$ position of the adjacent layer, wherein the dithering placement minimizes a formation of a residual structure in the layer stack, and wherein the dithering placement results in a variation of a volume element density based on the conditions for the dithering placement of the volume element, the variation of the volume element density in the layer of the layer stack being a digital representation of a variation of ink droplets in the layer.

2. The method according to claim 1, wherein one of the following conditions apply:

when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions and volume elements are positioned in each of a discrete $x_{m+2}, y_{m+2}, z_{m+2} \ldots x_{n+2}, y_{n+2}, z_{n+2}$ positions of a next but one layer of the layer stack;

when in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions discrete $x_{m+2}, y_{m+2}, z_{m+2} \ldots x_{n+2}, y_{n+2}, z_{n+2}$ positions of a next but one layer of the layer stack, a discrete $x_{m+2}, y_{m+2}, z_{m+2} x_{n+2}, y_{n+2}, z_{n+2}$ position of the next but one layer being directly adjacent and on top of a discrete $x_{m+1}, y_{m+1}, z_{m+1} \ldots x_{n+1}, y_{n+1}, z_{n+1}$ position of the layer.

3. The method according to claim 1, wherein the following conditions apply:

when in 50% or more than 50% of the discrete $x_{m+2}, y_{m+2}, z_{m+2} \ldots x_{n+2}, y_{n+2}, z_{n+2}$ positions and in 66% or less than 66% of the discrete $x_{m+2}, y_{m+2}, z_{m+2} \ldots x_{n+2}, y_{n+2}, z_{n+2}$ positions of the next but one layer a volume element is to be positioned, then the volume element is positioned in a. a discrete $x_{m+2b}, y_{m+2b}, z_{m+2b} \ldots x_{n+2b}, y_{n+2b}, z_{n+2b}$ position not adjacent and not on top of a volume element in a discrete $x_{m+1}, y_{m+1}, z_{m+1}, x_{n+1}, y_{n+1}, z_{n+1}$ position of the layer and not on top of a volume element in a discrete $x_m, y_m, z_m \ldots x_n, y_n, z_n$ position of the adjacent layer, or b. a discrete $x_{m+2a}, y_{m+2a}, z_{m+2a} \ldots x_{n+2a}, y_{n+2a}, z_{n+2a}$ position adjacent and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or c. a discrete $x_{m+2b}, y_{m+2b}, z_{m+2b} \ldots x_{n+2b}, y_{n+2b}, z_{n+2b}$ position not adjacent and not on top of a volume element in a discrete $x_{m+1}, y_{m+1}, z_{m+1} \ldots x_{n+1}, y_{n+1}, z_{n+1}$ position of the layer and on top of a volume element in a discrete $x_{mb}, y_{mb}, z_{mb}, x_{nb}, y_{nb}, z_{nb}$ position of the adjacent layer, or d. a discrete $x_{m+2a}, y_{m+2a}, z_{m+2a} \ldots x_{n+2a}, y_{n+2a}, z_{n+2a}$ position adjacent and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma}, x_{na}, y_{na}, z_{na}$ position of the adjacent layer.

4. The method according to claim 1, wherein the following conditions apply:

when in more than 66% of discrete $x_{m+3}, y_{m+3}, z_{m+3} \ldots x_{n+3}, y_{n+3}, z_{n+3}$ positions and in 75% or less than 75% of the discrete $x_{m+3}, y_{m+3}, z_{m+3} \ldots x_{n+3}, y_{n+3}, z_{n+3}$ positions of an adjacent layer to the next but one layer a volume element is to be positioned, then the volume element is positioned in a. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m,y_m, z_m \ldots x_n, y_n,z_n$ position of the adjacent layer, or b. a discrete $x_{m+3b},y_{m+3b},z_{m+3b} \ldots x_{n+3b},y_{n+3b},z_{n+3b}$ position not adjacent and not on top of a volume element in a discrete $x_{m+2},y_{m+2},z_{m+2} \ldots x_{n+2},y_{n+2},z_{n+2}$ position of the next but one layer and not on top of a volume element in a discrete $x_{m+1},y_{m+1},z_{m+1} \ldots x_{n+1},y_{n+1},z_{n+1}$ position of the layer and on top of a volume element in a discrete $x_{mb}, y_{mb},z_{mb} \ldots x_{nb}, y_{nb},z_{nb}$ position of the adjacent layer, or c. a discrete $x_{m+3b},y_{m+3b},z_{m+3b} \ldots x_{n+3b},y_{n+3b},z_{n+3b}$ position not adjacent and not on top of a volume element in a discrete $x_{m+2},y_{m+2},z_{m+2} \ldots x_{n+2},y_{n+2},z_{n+2}$ position of the next but one layer and on top of a volume element in a discrete $x_{m+1b},y_{m+1b},z_{m+1b} \ldots x_{n+1b},y_{n+1b},z_{n+1b}$ position of the layer and not on top of a volume element in a discrete $x_m, y_m, z_m \ldots x_n,y_n,z_n$ position of the adjacent layer, or d. a discrete $x_{m+3a}, y_{m+3a},z_{m+3a} \ldots x_{n+3a},y_{n+3a},z_{n+3a}$ position adjacent and on top of a volume element in a discrete $x_{m+2a}, y_{m+2a},z_{m+2a} \ldots x_{n+2a},y_{n+2a},z_{n+2a}$ position of the next but one layer and not on top of a volume element in a discrete $x_{m+1},y_{m+1},z_{m+1} \ldots x_{n+1},y_{n+1},z_{n+1}$ position of the layer and not on top of a volume element in a discrete $x_m,y_m,z_m \ldots x_n,y_n, z_n$ position of the adjacent layer, or e. a discrete $x_{m+3a},y_{m+3a},z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and not on top of a volume element in a discrete $x_{m+1},y_{m+1},z_{m+1} \ldots x_{n+1}, y_{n+1},z_{n+1}$ position of the layer and on top of a volume element in a discrete $x_{ma}, y_{ma}, z_{ma} \ldots x_{na}, y_{na}, z_{na}$ position of the adjacent layer, or f. a discrete $x_{m+3a},y_{m+3a},z_{m+3a} \ldots x_{n+3a},y_{n+3a},z_{n+3a}$ position adjacent and on top of a volume element in a discrete $x_{m+2a},y_{m+2a},z_{m+2a} \ldots x_{n+2a}, y_{n+2a},z_{n+2a}$ position of the next but one layer and on top of a volume element in a discrete $x_{m+1a},y_{m+1a},z_{m+1a} \ldots x_{n+1a}, y_{n+1a},z_{n+1a}$ position of the layer and not on top of a volume element in a discrete $x_{ma}, y_{ma}, z_{ma} \ldots x_{na}, y_{na}, z_{na}$ position of the adjacent layer, or g. a discrete $x_{m+3b},y_{m+3b},z_{m+3b} \ldots x_{n+3b},y_{n+3b}, z_{n+3b}$ position not adjacent and not on top of a volume element in a discrete $x_{m+2},y_{m+2},z_{m+2} \ldots x_{n+2},y_{n+2},z_{n+2}$ position of the next but one layer and on top of a volume element in a discrete $x_{m+1b},y_{m+1b},z_{m+1b} \ldots x_{n+1b},y_{n+1b},z_{n+1b}$ position of the layer and on top of a volume element in a discrete $x_{mb}, y_{mb}, z_{mb} \ldots x_{nb}, y_{nb},z_{nb}$ position of the adjacent layer, or h. a discrete $x_{m+3a},y_{m+3a},z_{m+3a} \ldots x_{n+3a},y_{n+3a},z_{n+3a}$ position adjacent and on top of a volume element in a discrete $x_{m+2a}, y_{m+2a}, z_{m+2a} \ldots x_{n+2a}, y_{n+2a},z_{n+2a}$ position of the next but one layer and on top of a volume element in a discrete $x_{m+1a},y_{m+1a},z_{m+1a} \ldots x_{n+1a},y_{n+1a},z_{n+1a}$ position of the layer and on top of a volume element in a discrete $x_{ma}, y_{ma}, z_{ma} \ldots x_{na}, y_{na}, z_{na}$ position of the adjacent layer.

5. The method according to claim 1, wherein the following conditions apply:

when in more than 75% of discrete $x_{m+4},y_{m+4},z_{m+4} \ldots x_{n+4},y_{n+4},z_{n+4}$ positions and in less than 80% of the discrete $x_{m+4},y_{m+4},z_{m+4} \ldots x_{n+4},y_{n+4},z_{n+4}$ positions of a layer separated by three layers from the adjacent layer, i.e., of a layer being separated by the layer, the next but one layer, the adjacent layer to the next but one layer from the adjacent layer, a volume element is to be positioned, then the volume element is positioned in a. a discrete $x_{m+4b},y_{m+4b},z_{m+4b} \ldots x_{n+4b},y_{n+4b},z_{n+4b}$ position not adjacent and not on top of a volume element in a discrete $x_{m+3},y_{m+3},z_{m+3} \ldots x_{n+3},y_{n+3},z_{n+3}$ position of the layer adjacent to the next but one layer and not on top of a volume element in a discrete $x_{m+2}, y_{m+2},z_{m+2} \ldots x_{n+2},y_{n+2},z_{n+2}$ position of the next but one layer and not on top of a volume element in a discrete $x_{m+1},y_{m+1},z_{m+1} \ldots x_{n+1},y_{n+1},z_{n+1}$ position of the layer and not on top of a volume element in a discrete $x_m,y_m,z_m \ldots x_n, y_n,z_n$ position of the adjacent layer, or b. a discrete $x_{m+4b},y_{m+4b},z_{m+4b} \ldots x_{n+4b},y_{n+4b},z_{n+4b}$ position not adjacent and not on top of a volume element in a discrete $x_{m+3},y_{m+3},z_{m+3} \; x_{n+3},y_{n+3},z_{n+3}$ position of the layer adjacent to the next but one layer and not on top of a volume element in a discrete $x_{m+2}, y_{m+2},z_{m+2} \ldots x_{n+2},y_{n+2}, z_{n+2}$ position of the next but one layer and not on top of a volume element in a discrete $x_{m+1},y_{m+1},z_{m+1} \ldots x_{n+1},y_{n+1},z_{n+1}$ position of the layer and on top of a volume element in a discrete $x_m,y_m,z_m \ldots x_n,y_n,z_n$ position of the adjacent layer, or c. a discrete $x_{m+4b},y_{m+4b},z_{m+4b} \ldots x_{n+4b},y_{n+4b},z_{n+4b}$ position not adjacent and not on top of a volume element in a discrete $x_{m+3},y_{m+3},z_{m+3} \ldots x_{n+3},y_{n+3},z_{n+3}$ position of the layer adjacent to the next but one layer and not on top of a volume element in a discrete $x_{m+2}, y_{m+2}, z_{m+2} \ldots x_{n+2},y_{n+2},z_{n+2}$ position of the next but one layer and on top of a volume element in a discrete $x_{m+1b},y_{m+1b},z_{m+1b} \ldots x_{n+1b},y_{n+1b},z_{n+1b}$ position of the layer and not on top of a volume element in a discrete $x_m,y_m,z_m \ldots x_n,y_n,z_n$ position of the adjacent layer, or d. a discrete $x_{m+4b}, y_{m+4b},z_{m+4b} \ldots x_{n+4b},y_{n+4b},z_{n+4b}$ position not adjacent and not on top of a volume element in a discrete $x_{m+3},y_{m+3},z_{m+3} \ldots x_{n+3},y_{n+3},z_{n+3}$ position of the layer adjacent to the next but one layer and on top of a volume element in a discrete $x_{m+2b}, y_{m+2b}, z_{m+2b} \ldots x_{n+2b},y_{n+2b},z_{n+2b}$ position of the next but one layer and not on top of a volume element in a discrete $x_{m+1},y_{m+1},z_{m+1} \ldots x_{n+1},y_{n+1},z_{n+1}$ position of the layer and not on top of a volume element in a discrete $x_m,y_m,z_m \ldots x_n, y_n,z_n$ position of the adjacent layer, or e. a discrete $x_{m+4a}, y_{m+4a}, z_{m+4a} \ldots x_{n+4a}, y_{n+4a},z_{n+4a}$ position adjacent and on top of a volume element in a discrete $x_{m+3a}, y_{m+3a},z_{m+3a} \ldots x_{n+3a},y_{n+3a},z_{n+3a}$ position of the layer adjacent to the next but one layer and not on top of a volume element in a discrete $x_{m+2}, y_{m+2},z_{m+2} \ldots x_{n+2},y_{n+2},z_{n+2}$ position of the next but one layer and not on top of a volume element in a discrete $x_{m+1},y_{m+1},z_{m+1} \ldots x_{n+1},y_{n+1},z_{n+1}$ position of the layer and not on top of a volume element in a discrete $x_m,y_m,z_m \ldots x_n, y_n,z_n$ position of the adjacent layer, or f. a discrete $x_{m+4b},y_{m+4b},z_{m+4b} \ldots x_{n+4b},y_{n+4b},z_{n+4b}$ position not adjacent and not on top of a volume element in a discrete $x_{m+3},y_{m+3},z_{m+3} \ldots x_{n+3},y_{n+3},z_{n+3}$ position of the layer adjacent to the next but one layer and not on top of a volume element in a discrete $x_{m+2}, y_{m+2}, z_{m+2} \ldots x_{n+2}, y_{n+2},z_{n+2}$ position of the next but one layer and on top of a volume element in a discrete $x_{m+1b},y_{m+1b},z_{m+1b} \ldots x_{n+1b}, y_{n+1b},z_{n+1b}$ position of the layer and on top of a volume element in a discrete $x_{mb}, y_{mb}, z_{mb} \ldots x_{nb}, y_{nb}, z_{nb}$ position of the adjacent layer, or g. a discrete $x_{m+4b}, y_{m+4b},z_{m+4b} \ldots x_{n+4b},y_{n+4b},z_{n+4b}$ position not adjacent and not on top of a volume element in a discrete $x_{m+3},y_{m+3},z_{m+3} \ldots x_{n+3},y_{n+3},z_{n+3}$ position of the layer adjacent to the next but one layer and on top of a volume element in a discrete $x_{m+2b}$, $y_{m+2b}, z_{m+2b} \ldots x_{n+2b}, y_{n+2b}, z_{n+2b}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{mb}, y_{mb}, z_{mb} \ldots x_{nb}, y_{nb}, z_{nb}$ position of the adjacent layer, or h. a discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3} \ldots x_{n+3}, y_{n+3}, z_{n+3}$ position of the layer adjacent to the next but one layer and on top of a volume element in a discrete $x_{m+2b}$, $y_{m+2b}, z_{m+2b} \ldots x_{n+2b}, y_{n+2b}, z_{n+2b}$ position of the next but one layer and on top of a volume element in a discrete $x_{m+1b}, y_{m+1b}, z_{m+1b} \ldots x_{n+1b}, y_{n+1b}, z_{n+1b}$ position of the layer and not on top of a volume element in a discrete $x_m, y_m, z_m \ldots x_n, y_n, z_n$ position of the adjacent layer, or i. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}$, $y_{m+2}, z_{m+2} \ldots x_{n+2}, y_{n+2}, z_{n+2}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or j. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}$, $z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or k. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}$, $y_{m+2}, z_{m+2} \ldots x_{n+2}, y_{n+2}, z_{n+2}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or l. A discrete $x_{m+4b}, y_{m+4b}, z_{m+4b} \ldots x_{n+4b}, y_{n+4b}, z_{n+4b}$ position not adjacent and not on top of a volume element in a discrete $x_{m+3}, y_{m+3}, z_{m+3}$ $x_{n+3}, y_{n+3}, z_{n+3}$ position of the layer adjacent to the next but one layer and on top of a volume element in a discrete $x_{m+2b}$, $y_{m+2b}, z_{m+2b} \ldots x_{n+2b}, y_{n+2b}, z_{n+2b}$ position of the next but one layer and on top of a volume element in a discrete $x_{m+1b}, y_{m+1b}, z_{m+1b} \ldots x_{n+1b}, y_{n+1b}, z_{n+1b}$ position of the layer and on top of a volume element in a discrete $x_{mb}, y_{mb}, z_{mb} \ldots x_{nb}, y_{nb}, z_{nb}$ position of the adjacent layer, or m. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}, z_{ma} \ldots x_{na}, y_{na}, z_{na}$ position of the adjacent layer, or n. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}$, $z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}$, $z_{ma} \ldots x_{na}, y_{na}, z_{na}$ position of the adjacent layer, or o. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}, y_{m+2a}$, $z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or p. a discrete $x_{m+4a}, y_{m+4a}, z_{m+4a} \ldots x_{n+4a}, y_{n+4a}, z_{n+4a}$ position adjacent and on top of a volume element in a discrete $x_{m+3a}, y_{m+3a}, z_{m+3a} \ldots x_{n+3a}, y_{n+3a}, z_{n+3a}$ position of the layer adjacent to the next but one layer and on top of a volume element in a discrete $x_{m+2a}$, $y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

6. The method according to claim 1, further comprising the additional step of:
   (i) determining a deviation of an actual value of a layer thickness in a discrete $x_m, y_m, z_m \ldots x_n, y_n, z_n$ position of the adjacent layer from a default nominal value of the layer thickness in an identical discrete $x_m, y_m, z_m \ldots x_n, y_n, z_n$ position of the adjacent layer.

7. The method according to claim 6, further comprising the additional step of:
   (ii) determining a sum of the deviation and the actual value of the layer thickness.

8. The method according to claim 7, wherein one of the following conditions applies:
   when the sum is larger than half the default nominal value of the layer thickness then no volume element is positioned in a discrete $x_{m+1}, y_{m+1}, z_{m+1} \ldots x_{n+1}, y_{n+1}, z_{n+1}$ position of the layer of the layer stack; or
   when the sum is smaller than or equal to half the default nominal value of the layer thickness then a volume element is positioned in a discrete $x_{m+1}, y_{m+1}, z_{m+1} \ldots x_{n+1}, y_{n+1}, z_{n+1}$ position of the layer of the layer stack.

9. The method according to claim 8, further comprising one of the additional steps selected from:
   determining a deviation of a default nominal value of a layer thickness in the discrete $x_{m+1}, y_{m+1}, z_{m+1} \ldots x_{n+1}, y_{n+1}, z_{n+1}$ position of the layer following the positioning of a volume element and distributing the deviation to an adjacent discrete $x_{o+1}, y_{o+1}, z_{o+1} \ldots x_{p+1}, y_{p+1}, z_{p+1}$ position within the identical layer;
   determining a deviation of a default nominal value of a layer thickness in the discrete $x_{m+1}, y_{m+1}, z_{m+1} \ldots x_{n+1}, y_{n+1}, z_{n+1}$ position of the layer following the positioning of a volume element and transferring the deviation to a discrete $x_{m+2}, y_{m+2}, z_{m+2} \ldots x_{n+2}, y_{n+2}, z_{n+2}$ position of the next but one layer;

determining a deviation of a default nominal value of a layer thickness in the discrete $x_{m+1}, y_{m+1}, z_{m+1} \ldots x_{n+1}, y_{n+1}, z_{n+1}$ position of the layer following the non-positioning of a volume element and distributing the deviation to an adjacent discrete $x_{o+1}, y_{o+1}, z_{o+1} \ldots x_{p+1}, y_{p+1}, z_{p+1}$ position within the identical layer; or determining a deviation of a default nominal value of a layer thickness in the discrete $x_{m+1}, y_{m+1}, z_{m+1} \ldots x_{n+1}, y_{n+1}, z_{n+1}$ position of the layer following the non-positioning of a volume element and transferring the deviation to a discrete $x_{m+2}, y_{m+2}, z_{m+2} \ldots x_{n+2}, y_{n+2}, z_{n+2}$ position of the next but one layer.

10. The method according to claim 1, wherein each layer of the layer stack is having an identical spatial expansion when projected in a plane held by an x direction and a y direction.

11. A non-transitory computer-readable storage medium having a computer program comprising instructions which, when the computer program is executed by a computer, cause the computer to carry out the method of claim 1.

12. A non-transitory computer-readable storage medium having stored thereon the computer program of claim 11.

13. The method according to claim 1 further comprising: manufacturing a spectacle lens based on the digital twin of the spectacle lens.

14. The method according to claim 13, wherein a spatial expansion of the layer and the adjacent layer are identical.

15. The method according to claim 13, wherein an outermost of the adjacent layers is inkjet printed in or on a substrate, the substrate defining a lens surface of:
a front surface of the spectacle lens; or
a back surface of the spectacle lens.

16. The method according to claim 13, wherein a total volume of ink droplets in a layer is preset.

17. A computer-implemented method for calculating a digital twin of a spectacle lens for a purpose of a use of the digital twin for a manufacture of the spectacle lens with a dithering placement of a volume element, the digital twin comprising a layer stack, the method comprising a step of:
determining a sum of a deviation of a layer thickness and an actual value of a layer thickness, the deviation being a deviation of an actual value of a layer thickness in a discrete $x_m, y_m, z_m \ldots x_n, y_n, z_n$ position of an adjacent layer from a default nominal value of the layer thickness in an identical discrete $x_m, y_m, z_m \ldots x_n, y_n, z_n$ position of the adjacent layer,
the deviation being used as valid basis for positioning or for not positioning the volume element in a discrete $x_{m+1}, y_{m+1}, z_{m+1} \ldots x_{n+1}, y_{n+1}, z_{n+1}$ position of a layer, the discrete $x_{m+1}, y_{m+1}, z_{m+1} \ldots x_{n+1}, y_{n+1}, z_{n+1}$ position being adjacent and on top of a volume element in the discrete $x_m, y_m, z_m \ldots x_n, y_n, z_n$ position of the adjacent layer,
wherein the dithering placement minimizes a formation of a residual structure in the layer stack, and
wherein the dithering placement results in a variation of a volume element density based on the conditions for the dithering placement of the volume element, the variation of the volume element density in the layer of the layer stack being a digital representation of a variation of ink droplets in the layer.

18. The method according to claim 17, wherein one the following conditions applies:
when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions; or
when in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions.

19. The method according to claim 17, wherein one of the following conditions applies:
when in less than 50% of the discrete $x_m, y_m, z_m \ldots x_n, y_n, z_n$ positions a volume element is positioned, then no volume element is positioned in each of the discrete $x_{m+1}, y_{m+1}, z_{m+1} \ldots x_{n+1}, y_{n+1}, z_{n+1}$ positions and volume elements are positioned in each of a discrete $x_{m+2}, y_{m+2}, z_{m+2} \ldots x_{n+2}, y_{n+2}, z_{n+2}$ positions of a next but one layer of the layer stack;
when in 50% or more than 50% of the discrete $x_m, y_m, z_m \ldots x_n, y_n, z_n$ positions a volume element is positioned, then volume elements are positioned partially in the discrete $x_{m+1}, y_{m+1}, z_{m+1} \ldots x_{n+1}, y_{n+1}, z_{n+1}$ positions discrete $x_{m+2}, y_{m+2}, z_{m+2} \ldots x_{n+2}, y_{n+2}, z_{n+2}$ positions of a next but one layer of the layer stack,
a discrete $x_{m+2}, y_{m+2}, z_{m+2} \ldots x_{n+2}, y_{n+2}, z_{n+2}$ position of the next but one layer being directly adjacent and on top of a discrete $x_{m+1}, y_{m+1}, z_{m+1} \ldots x_{n+1}, y_{n+1}, z_{n+1}$ position of the layer.

20. The method according to claim 17, wherein the following condition applies:
when in 50% or more than 50% of the discrete $x_{m+2}, y_{m+2}, z_{m+2} \ldots x_{n+2}, y_{n+2}, z_{n+2}$ positions and in 66% or less than 66% of the discrete $x_{m+2}, y_{m+2}, z_{m+2} x_{n+2}, y_{n+2}, z_{n+2}$ positions of the next but one layer a volume element is to be positioned, then the volume element is positioned in a. a discrete $x_{m+2b}, y_{m+2b}, z_{m+2b} \ldots x_{n+2b}, y_{n+2b}, z_{n+2b}$ position not adjacent and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or b. a discrete $x_{m+2a}, y_{m+2a}, z_{m+2a} x_{n+2a}, y_{n+2a}, z_{n+2a}$ position adjacent and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_m, y_m, z_m \ldots x_n, y_n, z_n$ position of the adjacent layer, or c. a discrete $x_{m+2b}, y_{m+2b}, z_{m+2b} \ldots x_{n+2b}, y_{n+2b}, z_{n+2b}$ position not adjacent and not on top of a volume element in a discrete $x_{m+1}, y_{m+1}, z_{m+1} \ldots x_{n+1}, y_{n+1}, z_{n+1}$ position of the layer and on top of a volume element in a discrete $x_{mb}, y_{mb}, z_{mb} \ldots x_{nb}, y_{nb}, z_{nb}$ position of the adjacent layer, or d. a discrete $x_{m+2a}, y_{m+2a}, z_{m+2a} x_{n+2a}, y_{n+2a}, z_{n+2a}$ position adjacent and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

21. The method according to claim 17, wherein the following condition applies:
when in more than 66% of discrete $x_{m+3}, y_{m+3}, z_{m+3} \ldots x_{n+3}, y_{n+3}, z_{n+3}$ positions and in 75% or less than 75% of the discrete $x_{m+3}, y_{m+3}, z_{m+3} \ldots x_{n+3}, y_{n+3}, z_{n+3}$ positions of an adjacent layer to the next but one layer a volume element is to be positioned, then the volume element is positioned in a. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or b. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{mb}, y_{mb}, z_{mb} \ldots x_{nb}, y_{nb}, z_{nb}$ position of the adjacent layer, or c. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and not on top of a volume element in a discrete $x_m, y_m, z_m \ldots x_n, y_n, z_n$ position of the adjacent layer, or d. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and not on top of a volume element in a discrete $x_m, y_m, z_m \ldots x_n, y_n, z_n$ position of the adjacent layer, or e. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a}, x_{n+2a}, y_{n+2a}, z_{n+2a}$ position of the next but one layer and not on top of a volume element in a discrete $x_{m+1}, y_{m+1}, z_{m+1} \ldots x_{n+1}, y_{n+1}, z_{n+1}$ position of the layer and on top of a volume element in a discrete $x_{ma}, y_{ma}, z_{ma} \ldots x_{na}, y_{na}, z_{na}$ position of the adjacent layer, or f. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and not on top of a volume element in a discrete $x_{ma}, y_{ma}, z_{ma} \ldots x_{na}, y_{na}, z_{na}$ position of the adjacent layer, or g. a discrete $x_{m+3b}, y_{m+3b}, z_{m+3b} \ldots x_{n+3b}, y_{n+3b}, z_{n+3b}$ position not adjacent and not on top of a volume element in a discrete $x_{m+2}, y_{m+2}, z_{m+2} \ldots x_{n+2}, y_{n+2}, z_{n+2}$ position of the next but one layer and on top of a volume element in a discrete $x_{m+1b}, y_{m+1b}, z_{m+1b} \ldots x_{n+1b}, y_{n+1b}, z_{n+1b}$ position of the layer and on top of a volume element in a discrete $x_{mb}, y_{mb}, z_{mb} \ldots x_{nb}, y_{nb}, z_{nb}$ position of the adjacent layer, or h. a discrete $x_{m+3a}, y_{m+3a}, z_{m+3a} \ldots x_{n+3a}, y_{n+3a}, z_{n+3a}$ position adjacent and on top of a volume element in a discrete $x_{m+2a}, y_{m+2a}, z_{m+2a} \ldots x_{n+2a}, y_{n+2a}, z_{n+2a}$ position of the next but one layer and on top of a volume element in a discrete $x_{m+1a}, y_{m+1a}, z_{m+1a} \ldots x_{n+1a}, y_{n+1a}, z_{n+1a}$ position of the layer and on top of a volume element in a discrete $x_{ma}, y_{ma}, z_{ma} \ldots x_{na}, y_{na}, z_{na}$ position of the adjacent layer.

22. A computer being configured to perform a step of:
determining a volume element positioning in a layer of a layer stack of a digital twin with a dithering placement of a volume element, wherein (i) a positioning the volume element in a discrete $x_{m+1}, y_{m+1}, z_{m+1} \ldots x_{n+1}, y_{n+1}, z_{n+1}$ position of a layer of the layer stack is based on a positioning of a volume element in a discrete $x_m, y_m, z_m \ldots x_n, y_n, z_n$ position of an adjacent layer of the layer stack, or (ii) a not positioning a volume element in a discrete $x_{m+1}, y_{m+1}, z_{m+1} \ldots x_{n+1}, y_{n+1}, z_{n+1}$ position of a layer of the layer stack is based on a positioning of a volume element in a discrete $x_m, y_m, z_m \ldots x_n, y_n, z_n$ position of an adjacent layer of the layer stack, the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer, following the condition:

when in 50% or in less than 50% of discrete $x_m, y_m, z_m \ldots x_n, y_n, z_n$ positions of the adjacent layer a volume element is positioned, then no volume element is positioned in discrete $x_{m+1}, y_{m+1}, z_{m+1} \ldots x_{n+1}, y_{n+1}, z_{n+1}$ positions of the layer;

when in more than 50% of discrete $x_m, y_m, z_m \ldots x_n, y_n, z_n$ positions of the adjacent layer a volume element is positioned, then volume elements are positioned partially in discrete $x_{m+1}, y_{m+1}, z_{m+1} \ldots x_{n+1}, y_{n+1}, z_{n+1}$ positions of the layer, the digital twin being for the purpose of a use for manufacturing the spectacle lens, wherein the dithering placement minimizes a formation of a residual structure in the layer stack, and wherein the dithering placement results in a variation of a volume element density based on the conditions for the dithering placement of the volume element, the variation of the volume element density in the layer of the layer stack being a digital representation of a variation of ink droplets in the layer.

23. A computer being configured to perform a step of:
determining a volume element positioning in a layer of a layer stack of a digital twin with a dithering placement of a volume element, wherein (iii) a positioning a volume element in a discrete $x_{m+1}, y_{m+1}, z_{m+1} \ldots x_{n+1}, y_{n+1}, z_{n+1}$ position of a layer of the layer stack is based on a positioning of a volume element in a discrete $x_m, y_m, z_m \ldots x_n, y_n, z_n$ position of an adjacent layer of the layer stack, or (iv) a not positioning a volume element in a discrete $x_{m+1}, y_{m+1}, z_{m+1} \ldots x_{n+1}, y_{n+1}, z_{n+1}$ position of a layer of the layer stack is based on a positioning of a volume element in a discrete $x_m, y_m, z_m \ldots x_n, y_n, z_n$ position of an adjacent layer of the layer stack, the discrete $x_{m+1}, y_{m+1}, z_{m+1} \ldots x_{n+1}, y_{n+1}, z_{n+1}$ position of the layer being directly adjacent and on top of the discrete $x_m, y_m, z_m \ldots x_n, y_n, z_n$ position of the adjacent layer, following the condition:

when in 50% or in less than 50% of discrete $x_m, y_m, z_m \ldots x_n, y_n, z_n$ positions of the adjacent layer a volume element is positioned, then no volume element is positioned in discrete $x_{m+1}, y_{m+1}, z_{m+1} \ldots x_{n+1}, y_{n+1}, z_{n+1}$ positions of the layer;

when in more than 50% of discrete $x_m, y_m, z_m \ldots x_n, y_n, z_n$ positions of the adjacent layer a volume element is positioned, then volume elements are positioned partially in discrete $x_{m+1}, y_{m+1}, z_{m+1} \ldots x_{n+1}, y_{n+1}, z_{n+1}$ positions of the layer, and computer-readable printing instructions executed by an inkjet printer printing a spectacle lens according to the condition, wherein the dithering placement minimizes a formation of a residual structure in the layer stack, and wherein the dithering placement results in a variation of a volume element density based on the conditions for the dithering placement of the volume element, the variation of the volume element density in the layer of the layer stack being a digital representation of a variation of ink droplets in the layer.

\* \* \* \* \*